United States Patent
Mikami et al.

(10) Patent No.: US 10,341,294 B2
(45) Date of Patent: Jul. 2, 2019

(54) UNAUTHORIZED COMMUNICATION DETECTION SYSTEM AND UNAUTHORIZED COMMUNICATION DETECTION METHOD

(71) Applicant: HITACHI, LTD., Tokyo (JP)

(72) Inventors: Shugo Mikami, Tokyo (JP); Hiroki Uchiyama, Tokyo (JP); Satoshi Ohkubo, Tokyo (JP); Kohhei Yamaguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 173 days.

(21) Appl. No.: 15/592,250

(22) Filed: May 11, 2017

(65) Prior Publication Data
US 2017/0331787 A1    Nov. 16, 2017

(30) Foreign Application Priority Data
May 16, 2016 (JP) .................................. 2016-097743

(51) Int. Cl.
*H04L 29/06* (2006.01)

(52) U.S. Cl.
CPC ...... *H04L 63/0245* (2013.01); *H04L 63/1416* (2013.01)

(58) Field of Classification Search
CPC .................. H04L 63/0245; H04L 63/1416
See application file for complete search history.

(56) References Cited

U.S. PATENT DOCUMENTS

| | | | |
|---|---|---|---|
| 2012/0030761 A1* | 2/2012 | Baba ................ | H04L 63/1416 726/23 |
| 2013/0212681 A1* | 8/2013 | Endoh ............... | H04L 63/1416 726/23 |
| 2014/0283047 A1 | 9/2014 | Dixit et al. | |

FOREIGN PATENT DOCUMENTS

| | | |
|---|---|---|
| JP | 2012-034273 A | 2/2012 |
| JP | 2014-179074 A | 9/2014 |

* cited by examiner

*Primary Examiner* — Meng Li
(74) *Attorney, Agent, or Firm* — Volpe and Koenig, P.C.

(57) ABSTRACT

A detection apparatus 30 stores a determination list (A1601) for determining whether there is unauthorized communication, receives a communication packet (A1501) flowing in a control system, determines whether a valid data pattern in the determination list (A1601) and a data pattern relating to the communication packet (A1501) match each other. When the valid data pattern in the determination list (A1601) and the data pattern relating to the communication packet do not match each other, the detection apparatus 30 calculates a similarity degree between the valid data pattern in the determination list and the data pattern relating to the communication packet, and determines whether the similarity degree satisfies a predetermined condition. When the similarity degree is determined not to satisfy the predetermined condition, the detection apparatus 30 determines that the communication packet (A1501) is an unauthorized communication packet.

11 Claims, 21 Drawing Sheets

UNAUTHORIZED COMMUNICATION DETECTION SYSTEM AND UNAUTHORIZED COMMUNICATION DETECTION METHOD

CROSS-REFERENCE TO PRIOR APPLICATION

This application relates to and claims the benefit of priority from Japanese Patent Application number 2016-097743, filed on May 16, 2016 the entire disclosure of which is incorporated herein by reference.

BACKGROUND

The present invention generally relates to an unauthorized communication detection system and an unauthorized communication detection method for verifying validity of a communication packet flowing in a control system and detecting unauthorized communication.

Control systems to be used in automobiles or social infrastructures such as electric power supply, rail transport, water supply, and gas supply, are required to maintain a pressure and a temperature that are set in advance by operating an apparatus such as a valve or an actuator based on information from sensors. In order to realize this operation, a built-in apparatus such as a controller needs to acquire information from sensors regularly, confirm and notify states to other controllers, servers, and the like, and perform control as necessary. Therefore, in general, a large amount of communication occurs periodically in a control system, and the control system performs processing based on the communication data.

Meanwhile, the control system has used a dedicated OS and a dedicated protocol so far, and is installed separately in an area that cannot be accessed from an external network such as the Internet. Thus, the control system has been considered to be immune from a cyber-attack such as a so-called computer virus or DoS attack. However, a general-purpose OS and a general protocol are increasingly adopted for reduction of costs, and also, the control system is promoted to be coupled to an information system for improved efficiency. In addition, in recent years, computer viruses targeting control systems have been found, which necessitates a technology for detecting infection of, for example, malware, and unauthorized access from outside not only in an information system but also in a control system.

In order to address this issue, a known technology uses a list of traffic patterns that are likely to occur in a network of a control system to detect unauthorized communication when a communication packet does not conform to the list (for example, see Japanese Patent Application Publication No. 2012-34273). Moreover, another known technology monitors a communication packet and physical measurement values of a control system, and correlates the communication packet with the physical measurement values, to thereby detect an unauthorized communication packet (for example, see Japanese Patent Application Publication No. 2014-179074).

SUMMARY

However, the built-in apparatus to be used in a control system has limited available resources, and thus has difficulty in creating a determination list that contains all the valid patterns of packets flowing in the control system. As a result, regarding communication packets, use of the determination list to detect a communication packet may cause a large amount of erroneous detection or non-detection. In addition, correlation of all the communication packets with measurement values of the control system may increase loads on an unauthorized communication detection apparatus.

The present invention has been made in view of the above-mentioned circumstances, and provides an unauthorized communication detection system and an unauthorized communication detection method capable of effectively reducing amounts of erroneous detection and non-detection of communication packets flowing in a control system even in a built-in apparatus having limited processing capabilities.

In order to achieve the above-mentioned object, an unauthorized communication detection system according to one embodiment of the present invention is an unauthorized communication detection system including a detection apparatus detecting unauthorized communication performed in a control system, the detection apparatus being configured to:
store a determination list for determining whether there is unauthorized communication;
receive a communication packet flowing in the control system;
determine whether reference data in the determination list and reception data on the communication packet match each other;
calculate, when the reference data in the determination list and the reception data on the communication packet do not match each other, a similarity degree between the reference data in the determination list and the reception data on the communication packet, and determine whether the similarity degree satisfies a predetermined condition; and
determine, when the similarity degree is determined not to satisfy the predetermined condition, that the communication packet is an unauthorized communication packet.

Moreover, an unauthorized communication detection method according to one embodiment of the present invention is an unauthorized communication detection method for detecting unauthorized communication performed in a control system, the method including:
receiving a communication packet flowing in the control system;
determining whether reference data in a determination list for determining whether there is unauthorized communication and reception data on the communication packet match each other;
calculating, when the reference data in the determination list and the reception data on the communication packet do not match each other, a similarity degree between the reference data in the determination list and the reception data on the communication packet, and determining whether the similarity degree satisfies a predetermined condition; and
determining, when the similarity degree is determined not to satisfy the predetermined condition, that the communication packet is an unauthorized communication packet.

According to the present invention, it is possible to reduce the amounts of erroneous detection and non-detection of communication packets flowing in a control system even in a built-in apparatus having limited processing capabilities.

DETAILED DESCRIPTION

Now, a description is given of an unauthorized communication detection system 1 and an unauthorized communication detection method for a control system according to one embodiment of the present invention. It should be noted that the present invention is not limited by the following description.

Figure 1:
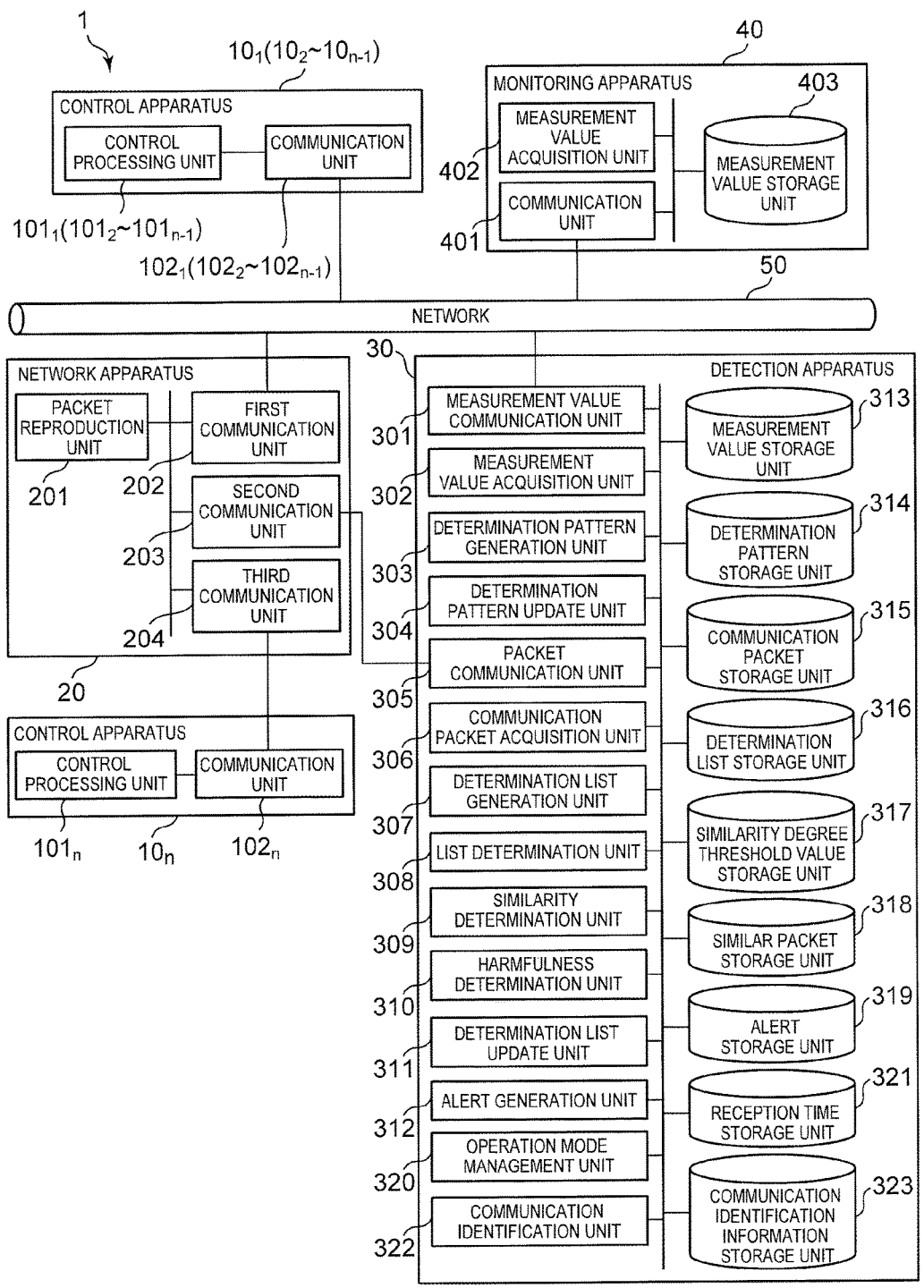
FIG. 1 is a diagram exemplifying a configuration of an unauthorized communication detection system for a control system according to a first embodiment of the present invention.

FIG. 1 is a configuration diagram of the unauthorized communication detection system 1 for a control system according to a first embodiment of the present invention.

As exemplified in FIG. 1, the unauthorized communication detection system 1 for a control system according to this embodiment includes control apparatus $10_1$ to $10_n$, a network apparatus 20, a detection apparatus 30, a monitoring apparatus 40, and a network 50. The control system as described herein is a control system to be used in automobiles and social infrastructures such as electric power supply, rail transport, water supply, and gas supply, and is configured to maintain a pressure and a temperature that are set in advance by operating a device such as a valve or an actuator based on information from sensors. It should be noted that the control apparatus $10_1$ to $10_n$, the network apparatus 20, the monitoring apparatus 40, and the network 50 also function as a part of the control system.

The control apparatus $10_1$ to $10_n$ include control processing units $101_1$ to $101_n$ configured to perform control processing, and communication units $102_1$ to $102_n$ configured to communicate with the network 50, the network apparatus 20, and other components.

The network apparatus 20 includes a packet reproduction unit 201 configured to reproduce a communication packet to be input to the network apparatus 20, a first communication unit 202 configured to communicate with the network 50, a second communication unit 203 configured to communicate with the detection apparatus 30, and a third communication unit 204 configured to communicate with the control apparatus $10_n$. The network apparatus 20 may include four or more communication units.

The detection apparatus 30 includes a measurement value communication unit 301, a measurement value acquisition unit 302, a determination pattern generation unit 303, a determination pattern update unit 304, a packet communication unit 305, a communication packet acquisition unit 306, a determination list generation unit 307, a list determination unit 308, a similarity determination unit 309, a harmfulness determination unit 310, a determination list update unit 311, an alert generation unit 312, a measurement value storage unit 313, a determination pattern storage unit 314, a communication packet storage unit 315, a determination list storage unit 316, a similarity degree threshold value storage unit 317, a similar packet storage unit 318, an alert storage unit 319, an operation mode management unit 320, a reception time storage unit 321, a communication identification unit 322, and a communication identification information storage unit 323.

The measurement value communication unit 301 is configured to communicate with the network 50. The measurement value acquisition unit 302 is configured to acquire a measurement value input to the detection apparatus 30. The determination pattern generation unit 303 is configured to generate a determination pattern from the acquired measurement value. The determination pattern update unit 304 is configured to update the generated determination pattern. The packet communication unit 305 is configured to communicate with the network apparatus 20. The communication packet acquisition unit 306 is configured to acquire a communication packet input to the detection apparatus 30. The determination list generation unit 307 is configured to generate a determination list from the acquired communication packet. The list determination unit 308 is configured to verify validity of the acquired communication packet. The similarity determination unit 309 is configured to determine a similarity between the acquired communication packet and the determination list when the acquired communication packet does not meet the determination list. The harmfulness determination unit 310 is configured to determine harmfulness of a communication packet using the generated determination pattern and the acquired measurement value when it is determined that there is a similarity as a result of the similarity determination. The determination list update unit 311 is configured to add a communication packet to the determination list when it is determined that the communication packet is not harmful. The alert generation unit 312 is configured to generate an alert when it is determined that the communication packet is harmful or there is no similarity.

The measurement value storage unit 313 is configured to store the measurement value acquired by the measurement value acquisition unit 302. The determination pattern storage unit 314 is configured to store a determination pattern generated from the acquired measurement value. The communication packet storage unit 315 is configured to store the communication packet acquired by the communication packet acquisition unit 306. The determination list storage unit 316 is configured to store information necessary for verifying validity of a communication packet. The similarity degree threshold value storage unit 317 is configured to store information to be used for determining a similarity between a communication packet and the determination list. The similar packet storage unit 318 is configured to store a communication packet when it is determined that the communication packet has a similarity as a result of the similarity determination performed by the similarity determination unit 309. The alert storage unit 319 is configured to store an alert generated by the alert generation unit 312. The operation mode management unit 320 is configured to manage an operation mode of the detection apparatus 30. The reception time storage unit 321 is configured to store information on a reception time when a communication packet is received. The communication identification unit 322 is configured to identify a communication protocol to be used in communication between the network 50 and the network apparatus 20. The communication identification information storage unit 323 is configured to store information necessary for identifying the communication protocol.

The monitoring apparatus 40 includes a communication unit 401 configured to communicate with the network 50, a measurement value acquisition unit 402 configured to acquire a measurement value input to the monitoring apparatus 40, and a measurement value storage unit 403 configured to store the measurement value acquired by the measurement value acquisition unit.

Figure 2:
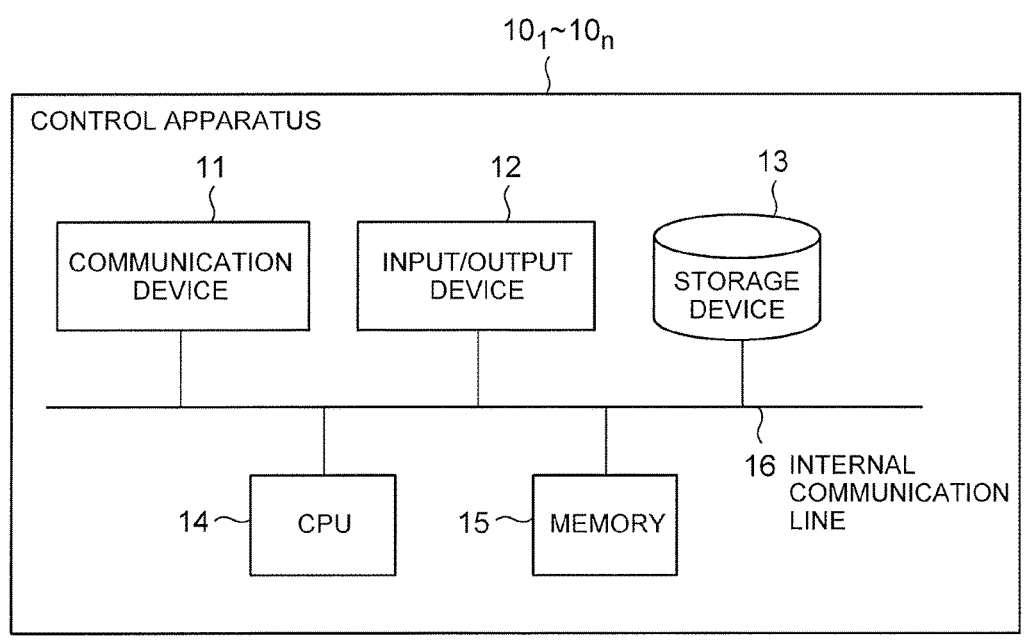
FIG. 2 is a diagram exemplifying a hardware configuration of a control apparatus illustrated in FIG. 1.

FIG. 2 is a diagram exemplifying a hardware configuration of the control apparatus $10_1$ to $10_n$.

Figure 3:
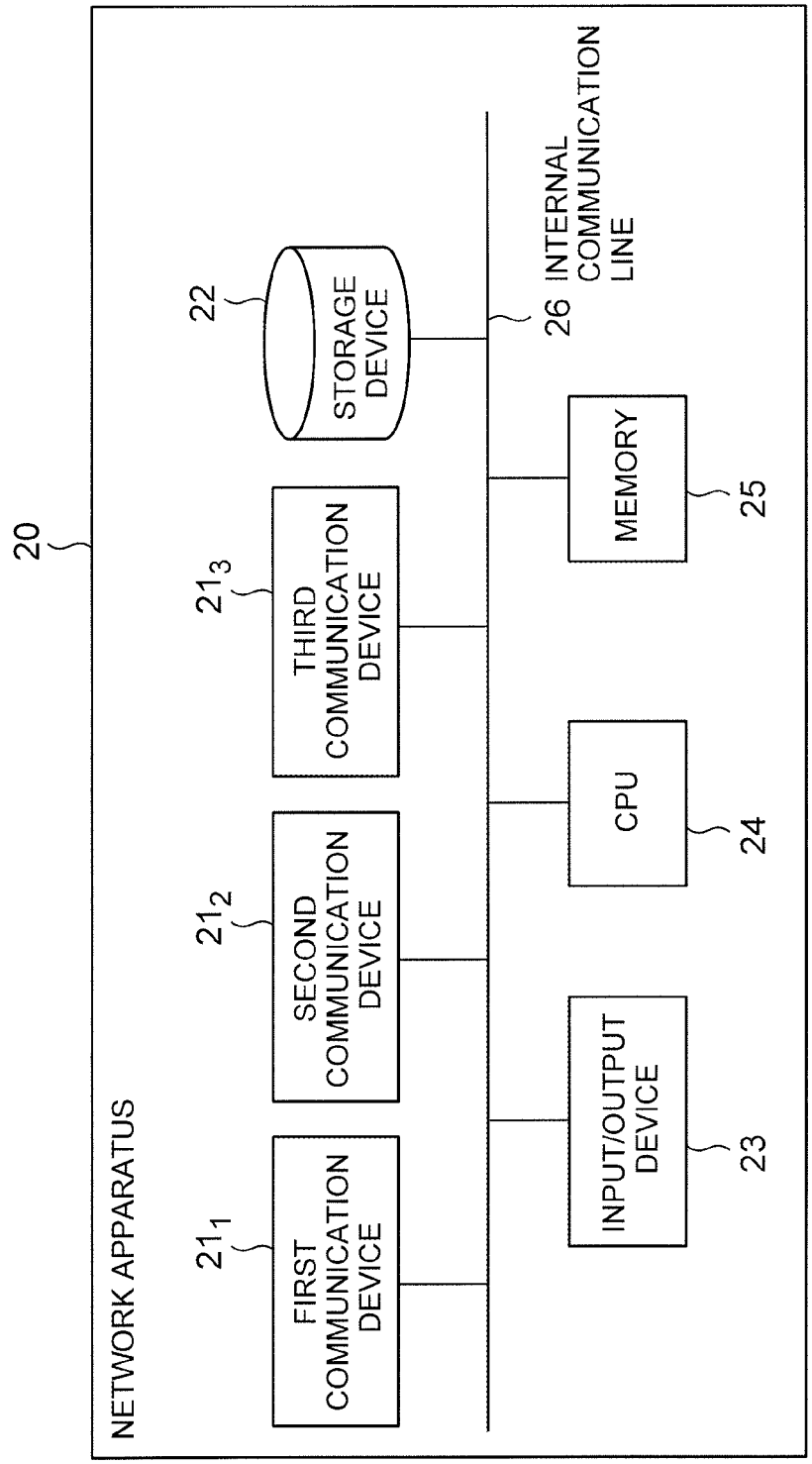
FIG. 3 is a diagram exemplifying a hardware configuration of a network apparatus illustrated in FIG. 1.

Each of the control apparatus $10_1$ to $10_n$ includes a communication device 11, an input/output device 12, a storage device 13, a CPU 14, and a memory 15, and respective components are coupled to one another via an internal communication line 16 such as a bus. Moreover, devices such as a sensor, a valve, and an actuator are coupled to each of the control apparatus $10_1$ to $10_n$. FIG. 3 is a diagram exemplifying a hardware configuration of the network apparatus 20.

The network apparatus 20 includes a first communication device $21_1$, a second communication device $21_2$, a third communication device $21_3$, a storage device 22, an input/output device 23, a CPU 24, and a memory 25, and respective components are coupled to one another via an internal communication line 26 such as a bus. The network apparatus 20 may include four or more communication devices.

Figure 4:
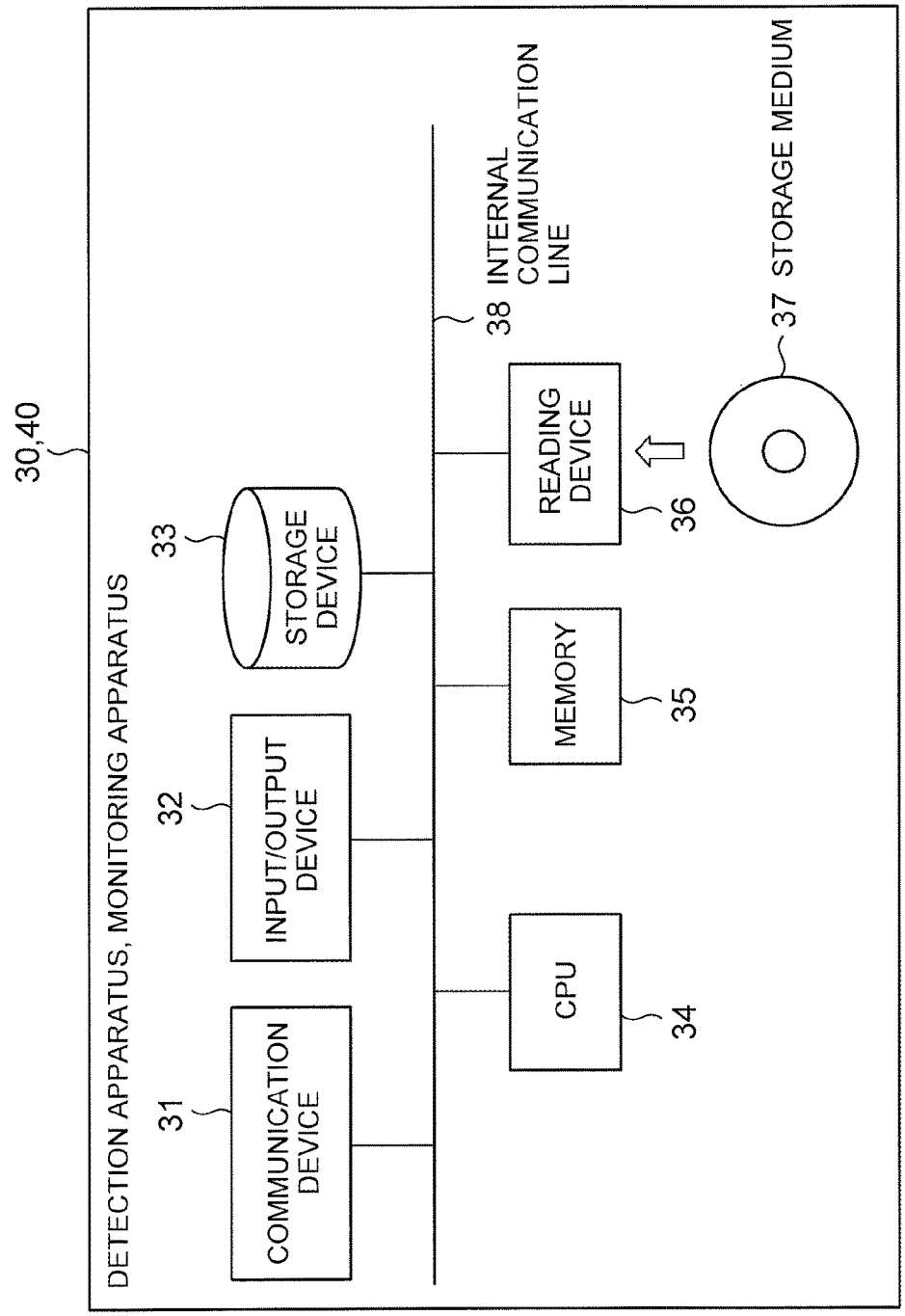
FIG. 4 is a diagram exemplifying a hardware configuration of a detection apparatus and a monitoring apparatus illustrated in FIG. 1.

FIG. 4 is a diagram exemplifying a hardware configuration of the detection apparatus 30 and the monitoring apparatus 40.

The detection apparatus 30 and the monitoring apparatus 40 each include a communication device 31, an input/output device 32, a storage device 33, a CPU 34, a memory 35, and a reading device 36 capable of reading a storage medium 37, and respective components are coupled to one another via an internal communication line 38 such as a bus. For example, at least a part of the communication units 301 and 305 in the detection apparatus 30 may be realized by at least a part of the communication device 31 and the input/output device 32. At least the communication device 31 of the communication device 31 and the input/output device 32 may be an example of a interface section which is one or more interfaces. Furthermore, for example, at least a part of the storage units 313 to 319, 321 and 323 in the detection apparatus 30 may be realized by at least a part of the storage device 33 and the memory 35. At least the memory 35 of the storage device 33 and the memory 35 may be an example of a storage section which includes one or more memories. Furthermore, for example, at least a part of the processing units 302 to 304, 306 to 312, 320 and 322 in the detection apparatus 30 may be realized by the CPU executing programs stored in the memory 35 and/or by a dedicated hardware circuit (for example, ASIC (Application Specific Integrated Circuit)). The CPU 34 may be an example of at least a part of a processor section which is one or more processor, and the processor section may include a hardware circuit which performs a part of or all of a process.

Next, a description is given of a processing flow in the unauthorized communication detection system 1 for a control system according to this embodiment. The processing flow described below is executed by each processing unit, which is embodied on an apparatus constructing the unauthorized communication detection system for a control system by loading programs stored in the storage devices of the control apparatus $10_1$ to $10_n$, the network apparatus 20, the detection apparatus 30, and the monitoring apparatus 40 into the memories for execution by the CPUs. Moreover, each program may be stored in a storage device in advance, or may be introduced as necessary via another storage medium or a communication medium (network or transmission wave propagating through network).

Figure 5:
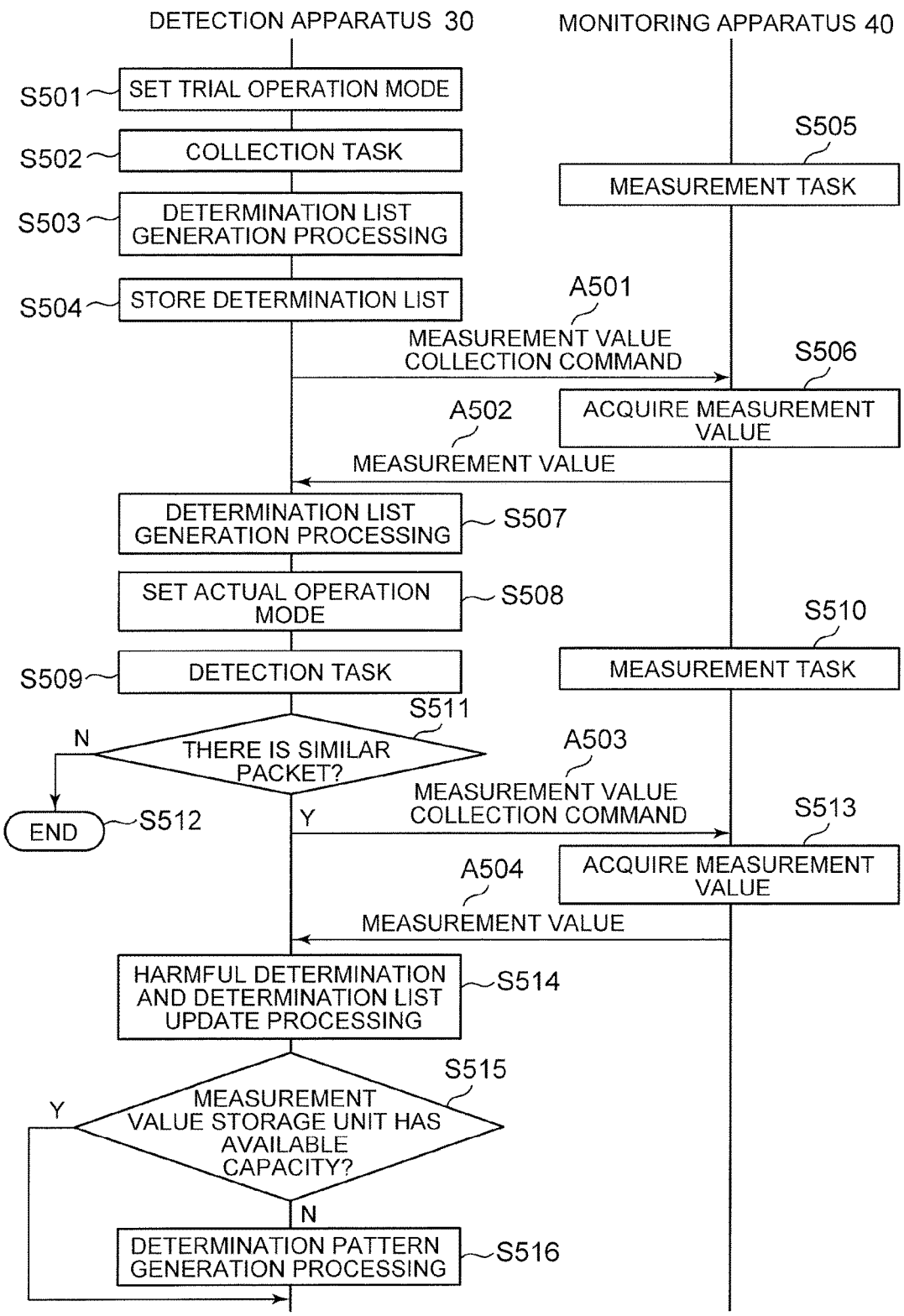
FIG. 5 is a diagram exemplifying a processing flow of detecting a communication packet in the unauthorized communication detection system for a control system according to the first embodiment of the present invention.

FIG. 5 is a diagram illustrating a processing flow involving: processing of generating a determination list and a determination pattern to be used for detection of a communication packet; processing of detecting a communication packet; and processing of updating the determination list and the determination pattern, which are executed by the detection apparatus 30 using the monitoring apparatus 40 in the unauthorized communication detection system 1 for a control system according to the first embodiment of the present invention.

First, the detection apparatus 30 sets an operation mode of the detection apparatus 30 to a trial operation mode (S501 (represented as S501; the same applies herein below)). When the operation mode cannot be set to the trial operation mode, or subsequent processing is executed without setting of the trial operation mode, the subsequent processing may be suspended.

Next, the detection apparatus 30 performs a task of collecting a communication packet in the trial operation mode (S502). The processing flow of the collection task is described in detail with reference to FIG. 6.

Next, the detection apparatus 30 performs determination list generation processing based on the communication packet (communication packet stored in the communication packet storage unit 315) collected in S502 (S503). The determination list is a list of data patterns generated based on communication packets that enable normal operation of the control system. An example of the determination list generation processing is assumed as follows. Specifically, the communication protocol such as DNP3.0, Ethernet/IP, or Modbus being used in communication is first identified using information such as a communication protocol number, a size, and a reception period of the communication packet stored in the communication packet collected in S502, and information stored in the communication identification information storage unit 323. Then, an area of the communication packet storing a data pattern to be used for the determination list generation is identified. However, the determination list generation processing is not limited to this method.

Moreover, an example of the method of generating an entry to be stored into the determination list storage unit 316 from a communication packet is assumed as follows. Specifically, a binary data pattern stored in the identified area of the communication packet is extracted, and information representing an area in the packet storing the data pattern and the data pattern itself are combined with each other to generate an entry, or the data pattern and information representing the communication period are combined with each other to generate an entry. However, the manner of generation is not limited to these methods.

Next, the detection apparatus 30 stores the generated entry into the determination list storage unit 316 (S504). An example of the method of storing the generated entry into the determination list (A1601, FIG. 16) is assumed to be adding a list ID serving as an entry number to the generated entry and storing a combination of the list ID and the entry into the determination list storage unit 316. However, the manner of storage is not limited to this method. The configuration of the determination list (A1601) is described in detail with reference to FIG. 16.

On the other hand, the monitoring apparatus 40 performs a task of measuring a measurement value (S505). The configuration of the measurement value is described in detail with reference to FIG. 12. Moreover, the processing flow of the measurement task is described in detail with reference to FIG. 7.

Next, the detection apparatus 30 transmits a measurement value collection command (A501) for collecting a measurement value to the monitoring apparatus 40. The configuration of the measurement value collection command is described in detail with reference to FIG. 13.

Next, the monitoring apparatus 40 acquires the measurement value stored in the measurement value storage unit 403 (S506).

Next, the monitoring apparatus 40 transmits the acquired measurement value to the detection apparatus 30 (A502).

Next, the detection apparatus 30 stores the acquired measurement value into the measurement value storage unit 313, and generates a determination pattern (A1401, FIG. 14) (S507). The determination pattern is assumed to be information on a variation amount and period of an individual measurement item such as a temperature or a pressure for each device such as a sensor or an actuator when the control system is controlled with a valid control command. However, the determination pattern is not limited to this information. The configuration of the determination pattern is described in detail with reference to FIG. 14. Moreover, the processing flow of the determination pattern generation processing is described in detail with reference to FIG. 8. Moreover, the processing step of S507 may be included in the processing step of S506.

Next, the operation mode of the detection apparatus 30 is set to an actual operation mode (S508).

Next, a detection task for communication packets acquired by the communication packet acquisition unit 306 is performed (S509). In the detection task, processing of, for example, extracting a communication packet having a data pattern similar to that of the determination list from the acquired communication packets is performed. The configuration of the communication packet is described in detail with reference to FIG. 15. Moreover, the processing flow of the detection task is described in detail with reference to FIG. 9.

On the other hand, the monitoring apparatus 40 performs a task of measuring a measurement value, which is similar to S505 (S510).

Next, the detection apparatus 30 determines whether there is a packet that is similar to an item of the determination list stored in the determination list storage unit 316 from among the communication packets acquired in S509 (S511). That is, the detection apparatus 30 determines whether a communication packet is stored in the similar packet storage unit 318. As a result, when it is determined that there is no communication packet, the processing is finished (S512).

On the contrary, when it is determined that there is a communication packet, the detection apparatus 30 transmits a measurement value collection command (A503) to the monitoring apparatus 40.

Next, the monitoring apparatus 40 acquires a measurement value stored in the measurement value storage unit 403 (S513).

Next, the monitoring apparatus 40 transmits the acquired measurement value to the detection apparatus 30 (A504).

Next, the detection apparatus 30 stores the acquired measurement value into the measurement value storage unit 313, and performs harmfulness determination and determination list update processing (S514). The processing flow of the harmfulness determination and determination list update processing is described in detail with reference to FIG. 11.

Next, the detection apparatus 30 determines whether the measurement value storage unit 313 has an available capacity (S515).

When it is determined that there is no available capacity as a result of the determination, the detection apparatus 30 performs determination pattern generation processing (S516). Similarly to the above, the configuration of the determination pattern is described in detail with reference to FIG. 14, and the processing flow of the determination pattern generation processing is described in detail with reference to FIG. 8. With this processing, a new determination pattern is generated instead of the determination pattern generated in S507, which enables generation of a determination pattern in accordance with a change of the control system over time. On the contrary, when it is determined that there is an available capacity, the processing of S516 is not performed.

After the processing of S516, processing of S509, S511, and S514 to S516 is executed repeatedly.

Figure 6:
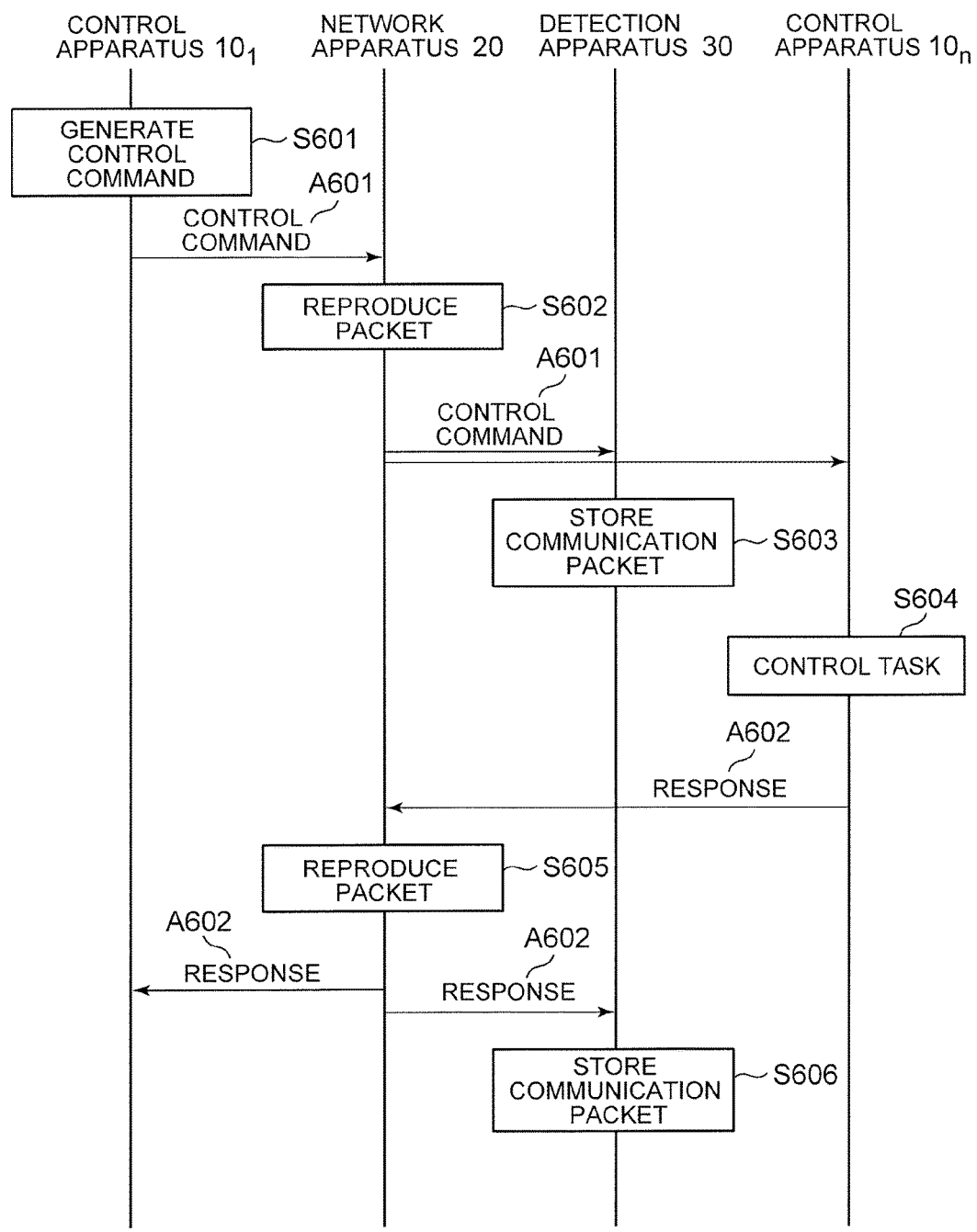
FIG. 6 is a diagram exemplifying a processing flow of collecting communication packets in a control task to be performed by the control apparatus at a time of a trial operation or the like with use of the detection apparatus in the unauthorized communication detection system for the control system according to the first embodiment of the present invention.

FIG. 6 is a diagram illustrating the processing flow of the collection task S502 to be performed by the detection apparatus in the unauthorized communication detection system 1 for a control system according to the first embodiment of the present invention.

First, the control apparatus $10_1$ generates a control command for a trial operation in response to the detection apparatus 30 set to the trial operation mode (S601). The control command for a trial operation is stored in the control apparatus $10_1$ in advance.

Next, the control apparatus $10_1$ transmits the generated control command (A601) to the control apparatus $10_n$ via the network apparatus 20.

Next, the network apparatus 20 reproduces the control command received from the control apparatus $10_1$ (S602).

Next, the network apparatus 20 transmits the reproduced control command (A601) to the detection apparatus 30 and the control apparatus $10_n$.

Next, the detection apparatus 30 stores the received communication packet into the communication packet storage unit 315 (S603).

Next, the control apparatus $10_n$ uses the control command (A601) received from the control apparatus $10_1$ to perform a task of controlling devices coupled to the control apparatus $10_n$ (S604). Next, the control apparatus $10_n$ transmits a response (A602) representing a result of processing each device to the control apparatus $10_1$.

Next, the network apparatus 20 reproduces the received response (A602) (S605).

Next, the network apparatus 20 transmits the reproduced response to the control apparatus $10_1$ and the detection apparatus 30. Next, the detection apparatus 30 stores the received response (A602) into the communication packet storage unit 315 (S606).

Figure 7:
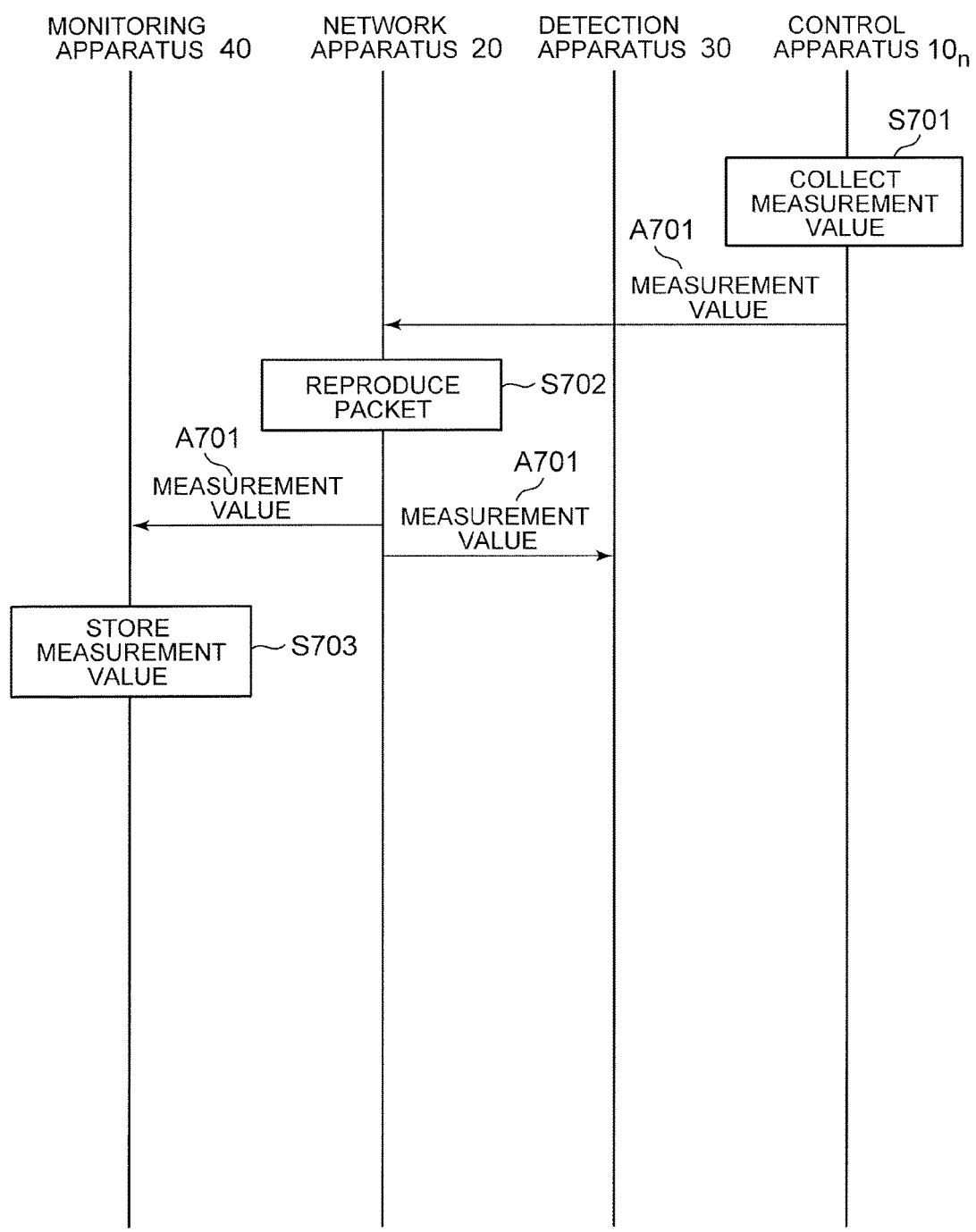
FIG. 7 is a diagram exemplifying a processing flow of collecting and storing measurement data, which is measured by the control apparatus with use of the monitoring apparatus in the unauthorized communication detection system for the control system according to the first embodiment of the present invention.

FIG. 7 is a diagram illustrating the processing flow of the measurement task S505 and S510 to be performed by the monitoring apparatus 40 in the unauthorized communication detection system 1 for a control system according to the first embodiment of the present invention.

First, the control apparatus $10_n$ collects collectable measurement values (S701). The measurement values may contain physical parameters such as a pressure, a temperature, and a timing of devices such as a sensor and an actuator, but are not limited to these parameters. Next, the control apparatus $10_n$ transmits the collected measurement values (A701) to the monitoring apparatus 40 via the network apparatus 20.

Next, the network apparatus 20 reproduces the received measurement values (A701) (S702).

Next, the network apparatus 20 transmits the reproduced measurement values (A701) to the monitoring apparatus 40 and the detection apparatus 30.

Next, the monitoring apparatus 40 stores the received measurement values (A701) into the measurement value storage unit 403 (S703). The detection apparatus 30 stores the received measurement values (A701) into the communication packet storage unit 315. The stored communication packets are used for the determination list generation processing (S503) and the detection task (S509).

Figure 8:
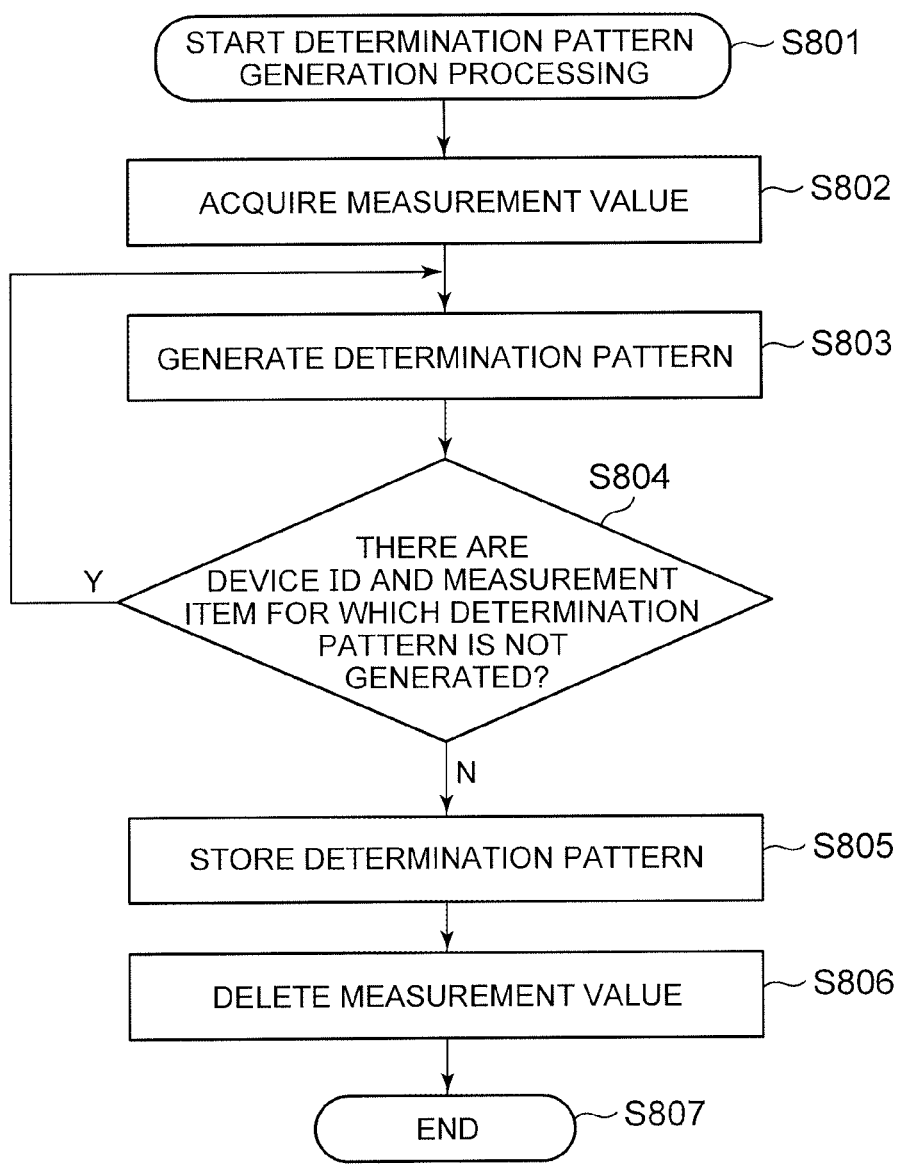
FIG. 8 is a diagram exemplifying a processing flow of determination pattern generation processing to be executed after a measurement value is acquired in the unauthorized communication detection system for the control system according to the first embodiment of the present invention.

FIG. 8 is a diagram illustrating the processing flow of the determination pattern generation processing S507 and S516 to be performed by the detection apparatus 30 in the unauthorized communication detection system 1 for a control system according to the first embodiment of the present invention.

First, the detection apparatus 30 starts the determination pattern generation processing (S801).

Next, the detection apparatus 30 acquires the measurement values stored in the measurement value storage unit 313 (S802).

Next, the detection apparatus 30 uses measurement data representing measurement items associated with the measurement values and representing the measured values, to generate determination patterns (S803). As described above, the determination pattern is assumed to be information on a variation amount and period of an individual measurement item such as a temperature or a pressure for each device such as a sensor or an actuator. However, the determination pattern is not limited to this information. Moreover, an example of the method of generating a determination pattern is assumed to be: classifying the acquired measurement values into device IDs associated with the measurement values; classifying in more detail the acquired measurement values into measurement items for each device ID; extracting information such as the maximum value, the minimum value, and a period for each measurement item; calculating information such as a variation amount from the extracted information; and combining the calculated information (valid measurement pattern), the measurement item, and the device ID with one another to generate a determination pattern. However, the manner of generation is not limited to this method.

Next, it is inspected whether there is a device ID and measurement item for which the determination pattern is not generated among the device IDs and the measurement items associated with the measurement values acquired in S802 (S804). As a result of this inspection, when it is determined that there is a device ID and measurement item for which the determination pattern is not generated, the detection apparatus 30 returns to Step S803 to generate a determination pattern for another device ID and measurement item.

On the contrary, when it is determined that the determination pattern is generated for all the device IDs and measurement items, the detection apparatus 30 stores the generated determination patterns into the determination pattern storage unit 314 (S805).

Next, the detection apparatus 30 deletes the measurement values stored in the measurement value storage unit 313 (S806). Next, the processing is finished (S807).

Figure 9:
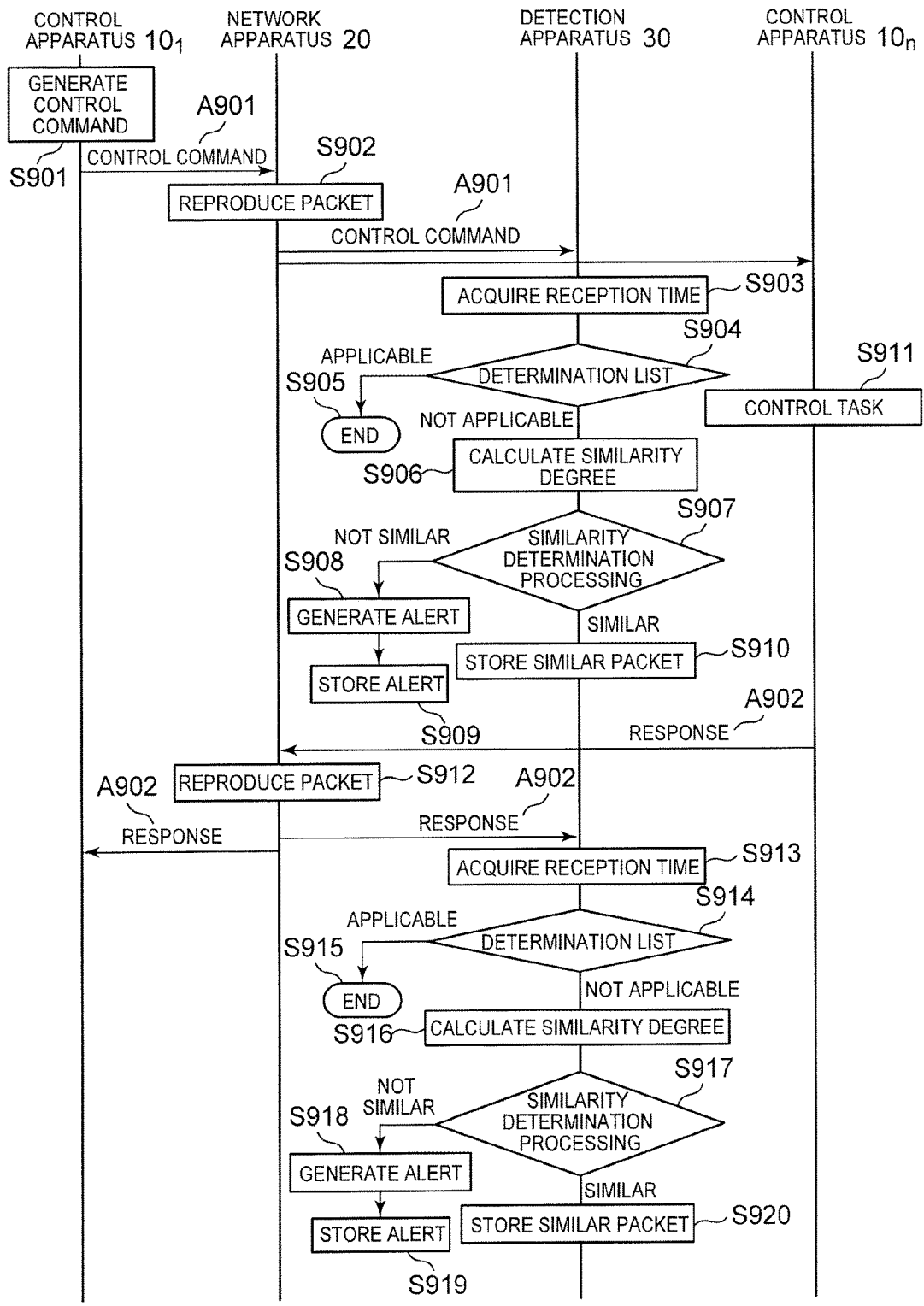
FIG. 9 is a diagram exemplifying a processing flow of verifying validity of a communication packet transmitted/received between the control apparatus with use of the detection apparatus in the unauthorized communication detection system for the control system according to the first embodiment of the present invention.

FIG. 9 is a diagram illustrating the processing flow of the detection task (S509) to be performed by the detection apparatus 30 in the unauthorized communication detection system 1 for a control system according to the first embodiment of the present invention. In the detection task, validity of a communication packet transmitted/received between the control apparatus is verified.

First, the control apparatus $10_1$ generates a control command for an actual operation in response to the detection apparatus 30 set to the actual operation mode (S901).

Next, the control apparatus $10_1$ transmits the generated control command (A901) to the control apparatus $10_n$ via the network apparatus 20.

Next, the network apparatus 20 reproduces the control command received from the control apparatus $10_1$ (S902).

Next, the network apparatus 20 transmits the reproduced control command (A901) to the detection apparatus 30 and the control apparatus $10_n$.

Next, the detection apparatus 30 acquires a reception time of the communication packet (A901), which is a control command received from the network apparatus 20 (S903). Moreover, the received communication packet (A901) is stored into the communication packet storage unit 315.

Next, the detection apparatus 30 performs determination processing for the received communication packet (A901) using the determination list stored in the determination list storage unit 316 (S904). That is, it is determined whether a data pattern (reception data) of packet data of the communication packet matches a valid data pattern (reference data) of a valid communication pattern in the determination list. In the case of determination using period information of communication packets, the determination is assumed to be performed by reading from the communication packet storage unit 315 communication packets received in the past. However, the manner of determination is not limited to this method. In this case, information on a reception pattern and a reception period of the communication packet corresponds to the data pattern. Moreover, reception data on the communication packet may be formed by combining the data pattern with information on an area storing the data pattern, or may be formed by combining these pieces of information with information on the reception period additionally.

As a result, when it is determined that the data pattern of packet data of the communication packet matches (corresponds to) a valid data pattern of a valid communication pattern in the determination list, the processing is finished (S905).

On the contrary, when it is determined that the data pattern of packet data of the communication packet does not match (does not correspond to) a valid data pattern of a valid communication pattern in the determination list, the detection apparatus 30 calculates a similarity degree using the determination list stored in the determination list storage unit 316 (S906). The processing flow of the similarity degree calculation processing is described in detail with reference to FIG. 10.

Next, the detection apparatus 30 performs similarity determination processing for the data pattern of the received communication packet and the data pattern in the determination list using the similarity degree calculated in S906 and information to be used at the time of determination of the similarity, which is stored in the similarity degree threshold value storage unit 317 (S907). In S907, the detection apparatus reads a threshold value stored in the similarity degree threshold value storage unit 317, and determines whether at least one of all the similarity degrees calculated in S906 falls within the threshold value (whether at least one of all the similarity degrees satisfies a predetermined condition). As a result, when it is determined that all the similarity degrees fall outside the threshold value, the detection apparatus 30 generates an alert (S908).

Next, the detection apparatus 30 stores the generated alert into the alert storage unit 319 (S909). On the contrary, when it is determined that at least one of all the similarity degrees falls within the threshold value, the detection apparatus 30 stores the communication packet into the similar packet storage unit 318 as a similar packet (S910). The configuration of the similar packet is described in detail with reference to FIG. 17. Moreover, when the similar packet storage unit 318 already stores the same data pattern, the detection apparatus 30 updates the number of patterns contained in the similar packet area of the already stored same data pattern, and does not store an additional similar packet.

Next, the control apparatus $10_n$ uses the control command (A601) received from the control apparatus $10_1$ to perform the task of controlling devices coupled to the control apparatus $10_n$ (S911). Next, the detection apparatus 30 transmits a response (A902) representing a result of processing each device to the control apparatus $10_1$.

Next, the network apparatus 20 reproduces the received response (A902) (S912).

Next, the network apparatus 20 transmits the reproduced response (A902) to the detection apparatus 30 and the control apparatus $10_1$.

Next, the detection apparatus 30 acquires the reception time of the communication packet (A902), which is a response received from the network apparatus 20 (S913).

Next, the detection apparatus 30 performs determination processing for the received communication packet (A902) using the determination list stored in the determination list storage unit 316 (S914). As a result, when it is determined that the data pattern of packet data of the communication packet matches (corresponds to) a valid data pattern of a valid communication pattern in the determination list, the processing is finished (S915).

On the contrary, when it is determined that the data pattern of packet data of the communication packet does not match (does not correspond to) a valid data pattern of a valid communication pattern in the determination list, the detection apparatus 30 calculates a similarity degree using the determination list stored in the determination list storage unit 316 (S916).

Next, the detection apparatus 30 performs similarity determination processing for the data pattern of the received packet and the data pattern in the determination list using the similarity degree calculated in S916 and information to be used at the time of determination of the similarity, which is stored in the similarity degree threshold value storage unit 317 (S917). In S917, the detection apparatus 30 reads a threshold value stored in the similarity degree threshold value storage unit 317, and determines whether all of the similarity degrees calculated in S916 fall within the threshold value.

As a result, when it is determined that not all the similarity degrees fall within the threshold value, the detection apparatus 30 generates an alert (S918).

Next, the detection apparatus 30 stores the generated alert into the alert storage unit 319 (S919).

On the contrary, when it is determined that all the similarity degrees fall within the threshold value, the detection apparatus 30 stores the communication packet into the similar packet storage unit 318 (S920). When the similar packet storage unit 318 already stores the same data pattern, the detection apparatus 30 updates the number of patterns contained in the similar packet area of the already stored same data pattern, and does not store an additional similar packet.

Figure 10:
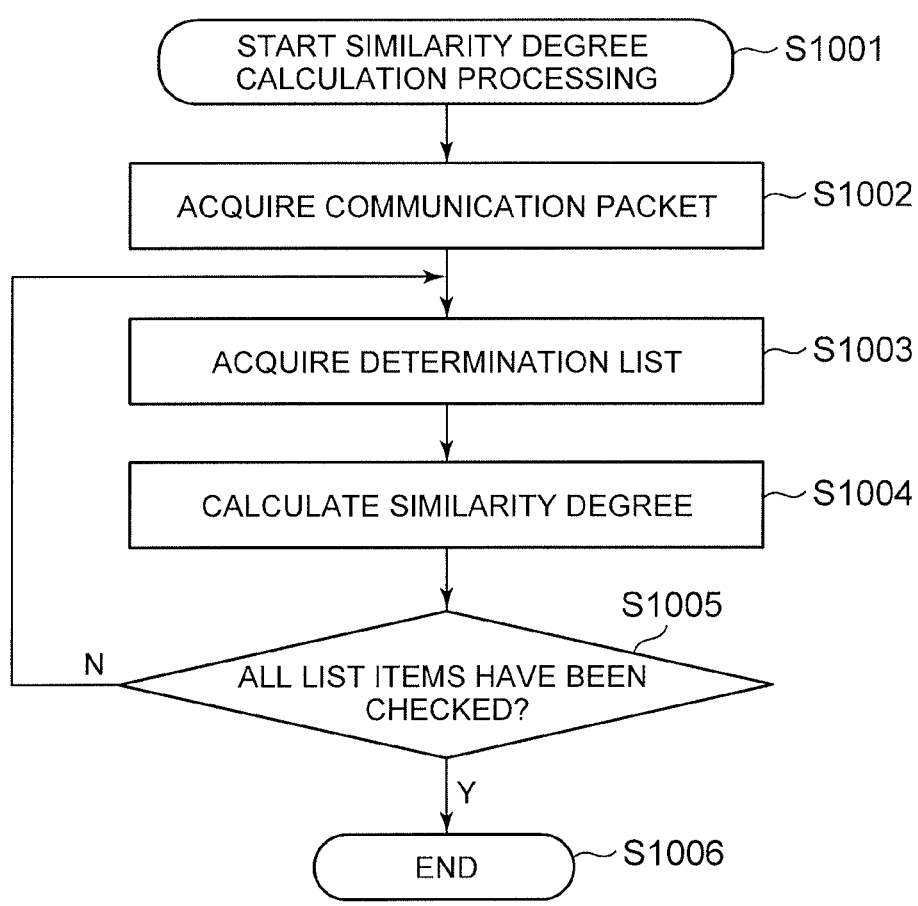
FIG. 10 is a diagram exemplifying a processing flow of calculating a similarity degree of a communication packet in the processing flow of verifying validity of a communication packet transmitted/received between the control apparatus with use of the detection apparatus in the unauthorized communication detection system for the control system according to the first embodiment of the present invention.

FIG. 10 is a diagram illustrating the processing flow of the similarity degree calculation processing S906 and S916 to be performed by the detection apparatus 30 in the unauthorized communication detection system 1 for a control system according to the first embodiment of the present invention.

First, the detection apparatus 30 starts the similarity degree calculation processing (S1001).

Next, the detection apparatus 30 acquires the communication packet (A901) stored in the communication packet storage unit 315 (S1002).

Next, the detection apparatus 30 acquires the determination list stored in the determination list storage unit 316 (S1003).

Next, the detection apparatus 30 uses packet data stored in the communication packet and a valid data pattern associated with the list ID stored in the determination list to calculate the similarity degree (S1004). The similarity degree in this case is calculated by, for example, a method of dividing the packet data and the valid data pattern into data blocks in units of byte, determining whether the packet data and the valid data pattern match each other for each data block, calculating the number of matched blocks, and dividing the number of the same blocks by the number of blocks, or the similarity degree in this case is calculated by fuzzy hashing. However, the manner of calculation is not limited to these methods.

Next, the detection apparatus 30 determines whether there is a list ID for which the similarity degree is not calculated from among the list IDs stored in the determination list storage unit 316 (S1005). As a result of the determination, when it is determined that there is a list ID for which the similarity degree is not calculated, the processing returns to Step S1003, and the detection apparatus 30 calculates a similarity degree using a valid data pattern associated with another list ID. On the contrary, when it is determined that the detection apparatus 30 has calculated similarity degrees for all the list IDs, the processing is finished (S1006).

Figure 11:
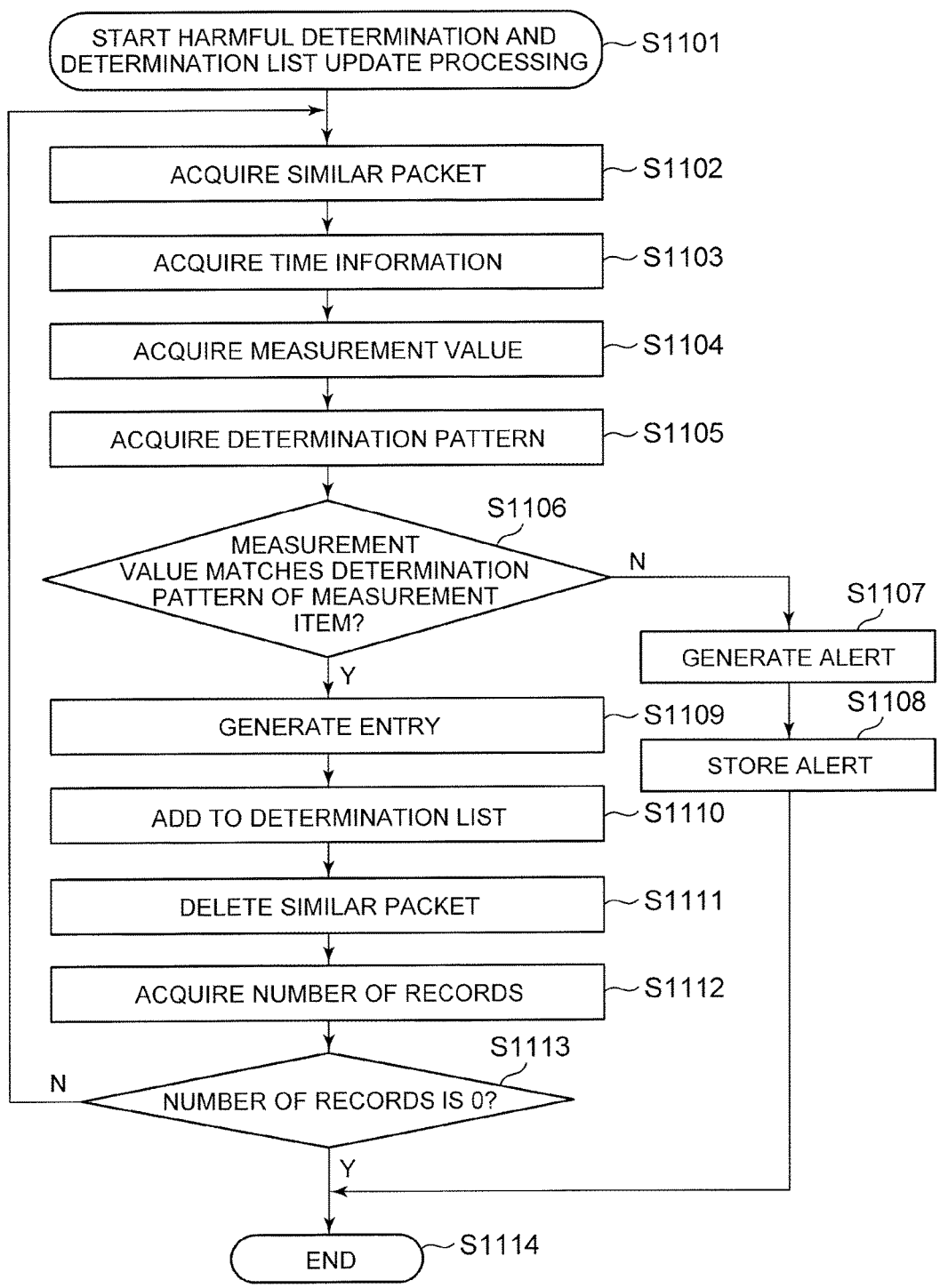
FIG. 11 is a diagram exemplifying a processing flow of processing of performing harmfulness determination and determination list update of a communication packet in the processing flow of verifying validity of a communication packet transmitted/received between the control apparatus with use of the detection apparatus in the unauthorized communication detection system for the control system according to the first embodiment of the present invention.

FIG. 11 is a diagram illustrating the processing flow of the harmfulness determination and determination list update processing S514 to be performed by the detection apparatus 30 in the unauthorized communication detection system 1 for a control system according to the first embodiment of the present invention.

First, the detection apparatus 30 starts the harmfulness determination and determination list update processing (S1101).

Next, the detection apparatus 30 acquires one similar packet from the similar packet storage unit 318 (S1102).

Next, the detection apparatus 30 collects reception time information on the similar packet from the reception time storage unit 321 (S1103).

Next, the detection apparatus 30 acquires measurement values of around the reception time of the similar packet from the measurement value storage unit 313 (S1104). An example of the method of acquiring the measurement values is assumed to be acquiring the measurement values based on the reception time, address information of a device in the similar packet, a measurement time of the measurement value, and the device ID. However, the manner of acquisition is not limited to this method.

Next, the detection apparatus 30 acquires a determination pattern from the determination pattern storage unit 314 (S1105).

Next, the detection apparatus 30 determines whether the measurement value acquired for each measurement item matches the determination pattern of the measurement item (S1106). For example, the measurement value is determined to match the determination pattern when measurement data of an individual measurement item such as a temperature or a pressure falls within a range of the variation amount set for the measurement item of the determination pattern, or when a period of opening/closing of a valve is equal to a period of the valve in the determination pattern. As a result, when it is determined that the measurement value acquired for each measurement item does not match the determination pattern of the measurement item, the detection apparatus 30 deletes the measurement value and generates an alert (S1107). In this manner, it is possible to detect an unauthorized communication packet, and notify an operator of the alert.

Next, the detection apparatus 30 stores the generated alert into the alert storage unit 319 (S1108).

On the contrary, when it is determined that the measurement value matches the determination pattern, the detection apparatus 30 generates an entry to be added to the determination list based on the similar packet (S1109). An example of the method of generating an entry is assumed to be extracting a data pattern stored in the similar packet. However, the manner of generation is not limited to this method.

Next, the detection apparatus 30 stores the generated entry into the determination list storage unit 316 (S1110). An example of the method of storing an entry is assumed to be adding a list ID serving as an entry number to the generated entry and storing a combination of the list ID and the entry into the determination list storage unit 316. However, the manner of storage is not limited to this method. With this, it is possible to add to the determination list a new entry relating to a communication packet having a valid data pattern based on the measurement result.

Next, the detection apparatus 30 deletes the similar packet from the similar packet storage unit 318 (S1111).

Next, the detection apparatus 30 acquires the number of records of similar packets stored in the similar packet storage unit 318 (S1112).

Next, the detection apparatus 30 determines whether there is a similar packet stored in the similar packet storage unit 318 (S1113). As a result of the determination, when it is determined that the number of records is not 0, the detection apparatus 30 returns to Step S1102, and acquires another similar packet from the similar packet storage unit 318. On the contrary, when it is determined that the number of records is 0, the processing is finished (S1114).

Figure 12:
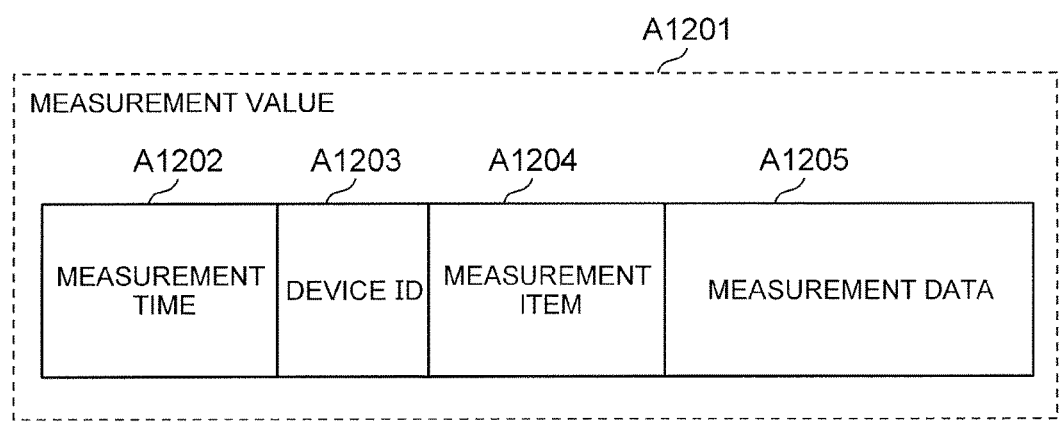
FIG. 12 is a diagram exemplifying a configuration of a measurement value of the control system to be stored into a measurement value storage unit of the detection apparatus or a measurement value storage unit of the monitoring apparatus in the unauthorized communication detection system for the control system according to the first embodiment of the present invention.

FIG. 12 is a diagram exemplifying a configuration of the measurement to be stored into the measurement value storage unit 403 of the monitoring apparatus 40 in the unauthorized communication detection system 1 for a control system according to the first embodiment of the present invention.

The measurement value (A1201) is formed of a measurement time (A1202) representing the time at which the measurement was performed, a device ID (A1203) representing information for identifying a device, a measurement item (A1204) representing information for identifying the measured value, and measurement data representing the measured value (A1205). An example of information to be used as the device ID is a method of using an IP address of a device, but the information is not limited to an IP address. Moreover, elements of the measurement value (A1201) are not limited to those described above, and it is sufficient that at least the above-mentioned elements are contained. Moreover, the order of elements of the measurement value (A1201) is not limited to that described above.

Figure 13:
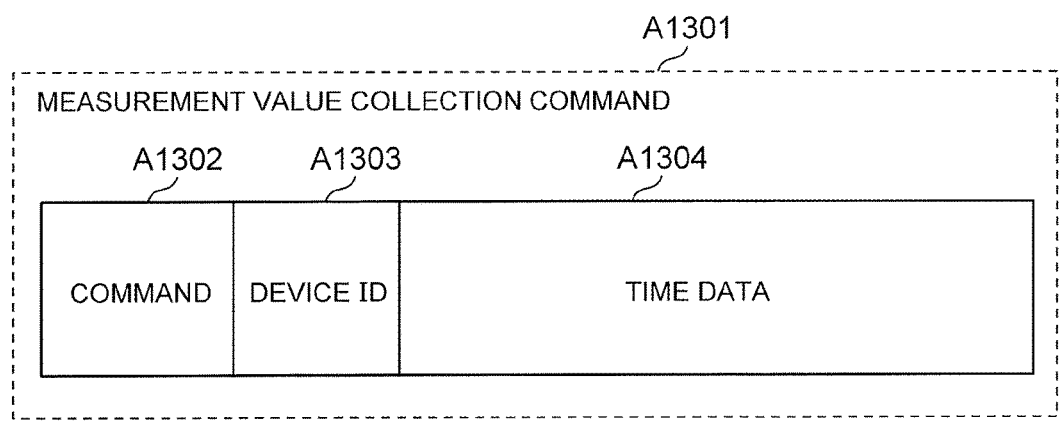
FIG. 13 is a diagram exemplifying a configuration of a measurement value collection command transmitted/received between the control apparatus and the monitoring apparatus in the unauthorized communication detection system for the control system according to the first embodiment of the present invention.

FIG. 13 is a diagram exemplifying a configuration of the measurement value collection command to be transmitted by the detection apparatus 30 to the monitoring apparatus 40 in the unauthorized communication detection system 1 for a control system according to the first embodiment of the present invention.

The measurement value collection command (A1301) is formed of a command (A1302), which is an instruction to collect a measurement value, a device ID (A1303) representing information for identifying a device, and time data (A1304) specifying a time of collection of the measurement value. The time data (A1304) may contain a collection start time and a collection end time of the measurement value, may contain a collection start time and a collection period of the measurement value, or may contain a plurality of collection times. Moreover, an example of the information to be used as the device ID is a method of using an IP address of a device, but the information is not limited to this information. Moreover, elements of the measurement value collection command (A1301) are not limited to those described above, and it is sufficient that at least the above-mentioned elements are contained. Moreover, the order of elements of the measurement value (A1301) is not limited to that described above.

Figure 14:
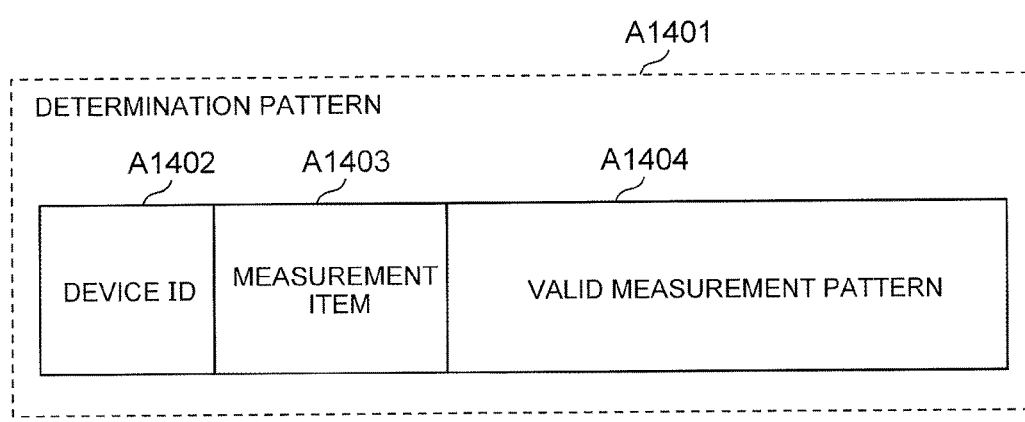
FIG. 14 is a diagram exemplifying a configuration of a determination pattern of the control system to be stored into a determination pattern storage unit of the detection apparatus in the unauthorized communication detection system for the control system according to the first embodiment of the present invention.

FIG. 14 is a diagram exemplifying a configuration of the determination pattern to be stored into the determination pattern storage unit 314 of the detection apparatus 30 in the unauthorized communication detection system 1 for a control system according to the first embodiment of the present invention.

The determination pattern (A1401) is formed of a device ID (A1402) representing information for identifying a device, a measurement item (A1403) representing information for identifying a measured value, and a valid measurement pattern (A1404) representing valid behavior of the measured value. An example of the information to be used as the device ID is a method of using an IP address of a device, but the information is not limited to this information. Moreover, elements of the determination pattern (A1401) are not limited to those described above, and it is sufficient that at least the above-mentioned elements are contained. Moreover, the order of elements of the measurement pattern (A1401) is not limited to that described above. Moreover, the measurement item (A1403) may contain one or a plurality of measurement items, or the valid measurement pattern (A1404) may contain a valid measurement pattern corresponding to one or a plurality of measurement items.

Figure 15:
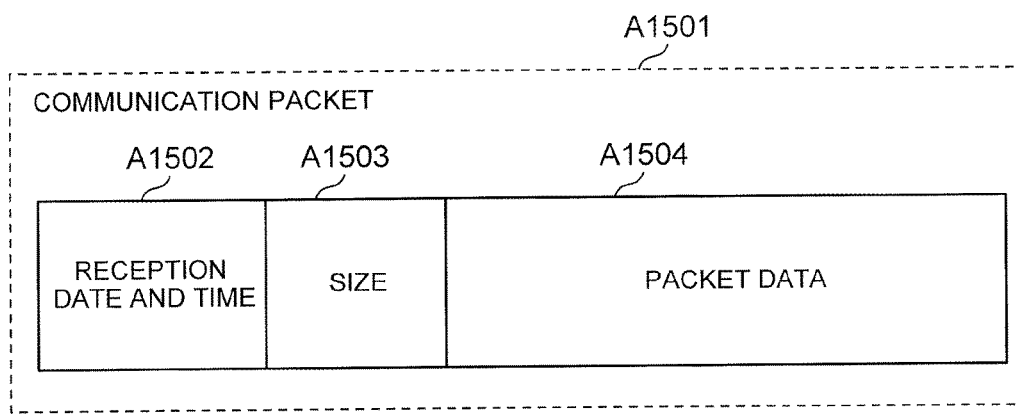
FIG. 15 is a diagram exemplifying a configuration of a communication packet to be stored into a communication packet storage unit of the detection apparatus in the unauthorized communication detection system for the control system according to the first embodiment of the present invention.

FIG. 15 is a diagram exemplifying a configuration of a communication packet to be stored into the communication packet storage unit 315 of the detection apparatus 30 in the unauthorized communication detection system 1 for a control system according to the first embodiment of the present invention.

The communication packet (A1501) is formed of a reception date and time (A1502) representing a date and time at which the packet is received, a size (A1503) representing a size of the packet, and packet data (A1504) representing binary data of the packet. Moreover, the packet data (A1504) is packet data representing a pattern of data contained in the payload. Elements of the communication packet (A1501) are not limited to those described above, and it is sufficient that at least the above-mentioned elements are contained. Moreover, the order of elements of the communication packet (A1501) is not limited to that described above. The packet data contains a control command, a response, a measurement value, or other values.

Figure 16:
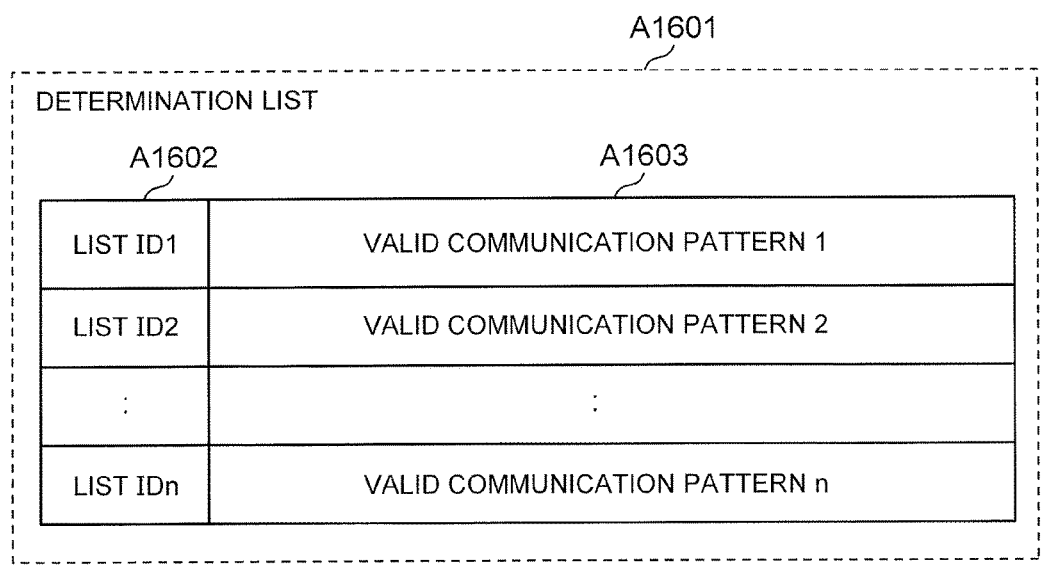
FIG. 16 is a diagram exemplifying a configuration of a determination list to be stored into a determination list storage unit of the detection apparatus in the unauthorized communication detection system for the control system according to the first embodiment of the present invention.

FIG. 16 is a diagram exemplifying a configuration of the determination list to be stored into the determination list storage unit 316 of the detection apparatus 30 in the unauthorized communication detection system 1 for a control system according to the first embodiment of the present invention.

The determination list (A1601) is formed of a list ID (A1602) representing information for identifying a valid data pattern and a valid communication pattern (A1603). The valid communication pattern (A1603, reference data) may be formed of a combination of information representing an area subject to detection processing within the communication packet and a valid data pattern contained in the detection area, or may be formed of a combination of a valid data pattern contained in the communication packet and reception period information such as information on time until next reception or the number of received packets, or may be formed of other pieces of information, or many be formed of other combinations. It is possible to make the processing speed faster by forming the valid communication pattern with only a valid data pattern, and it is possible to perform determination processing accurately by forming the valid communication pattern with a valid data pattern, information relating to an area storing a data pattern in the communication packet and/or information relating to a reception period of the data pattern. Moreover, elements of the determination list (A1601) are not limited to those described above, and it is sufficient that at least the above-mentioned elements are contained. Moreover, the order of elements of the determination list (A1601) is not limited to that described above.

Figure 17:
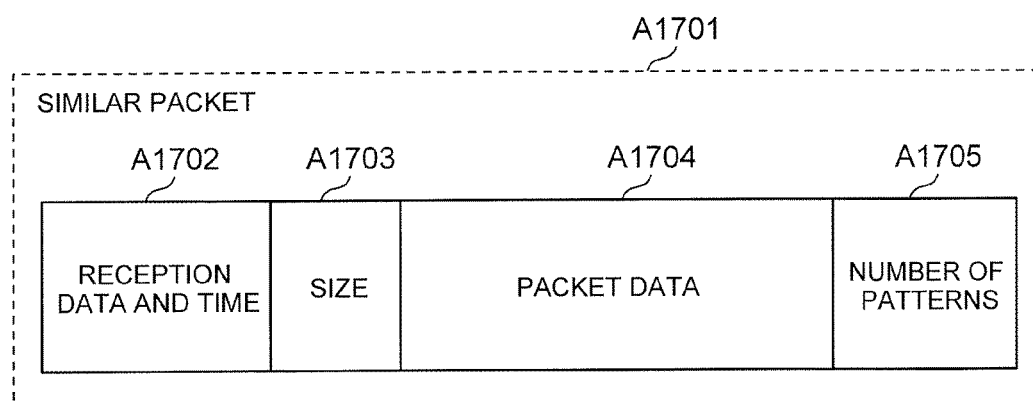
FIG. 17 is a diagram exemplifying a configuration of a similar packet to be stored into a similar packet storage unit of the detection apparatus in the unauthorized communication detection system for the control system according to the first embodiment of the present invention.

FIG. 17 is a diagram exemplifying a configuration of the similar packet to be stored into the similar packet storage unit 318 of the detection apparatus 30 in the unauthorized communication detection system 1 for a control system according to the first embodiment of the present invention.

The similar packet (A1701) is formed of a reception time and date (A1702) representing a data and time at which the packet is received, a size (A1703) representing a size of the packet, packet data (A1704) representing a pattern of data contained in the payload, and the number of patterns (A1705) representing the number of times of reception of packet data. For example, a method of specifying, as the reception time and date (A1702), a reception time and date at which a communication packet containing the packet data (A1705) is received for the first time is assumed, but the manner of specification is not limited to this method. Moreover, elements of the similar packet (A1701) are not limited to those described above, and it is sufficient that at least the above-mentioned elements are contained. Moreover, the order of elements of the similar packet (A1701) is not limited to that described above.

As described above, with the unauthorized communication detection system 1 according to this embodiment, it is possible to construct the unauthorized communication detection system 1 with a low load, and therefore it is possible to provide the unauthorized communication detection system 1 and the unauthorized communication detection method capable of effectively reducing amounts of erroneous detection and non-detection of communication packets flowing in a control system even in a built-in apparatus having limited processing capabilities.

Next, a description is given of an unauthorized communication detection system 2001 for a control system according to a second embodiment of the present invention.

Figure 18:
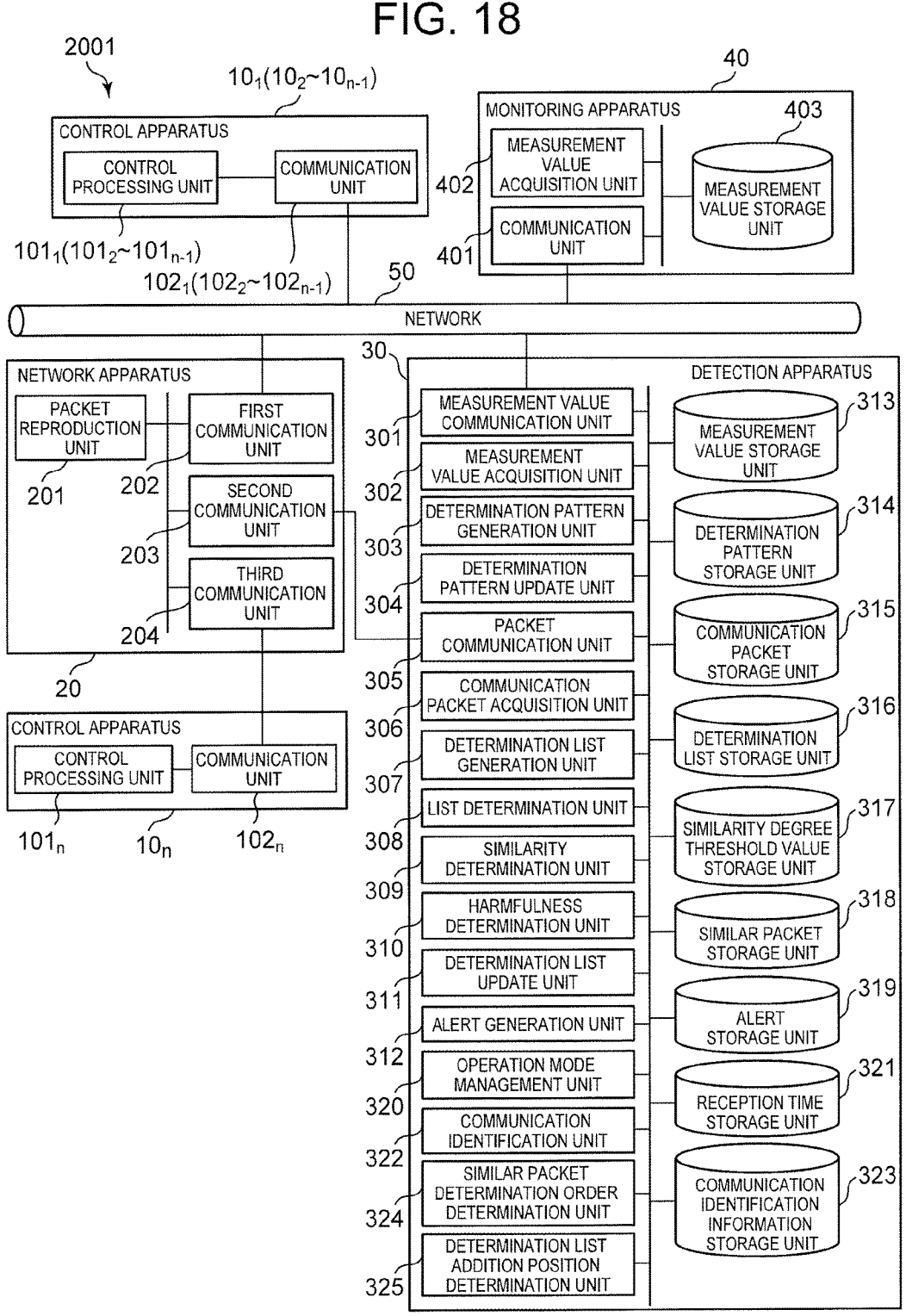
FIG. 18 is a diagram exemplifying a configuration of an unauthorized communication detection system for a control system according to a second embodiment of the present invention.

FIG. 18 is a configuration diagram illustrating the unauthorized communication detection system 2001 for a control system according to the second embodiment of the present invention.

As exemplified in FIG. 18, the unauthorized communication detection system for a control system according to this embodiment includes the control apparatus $10_1$ to $10_n$, the network apparatus 20, the detection apparatus 30, the monitoring apparatus 40, and the network 50.

The components of the control apparatus $10_1$ to $10_n$, the network apparatus 20, and the monitoring apparatus 40 are similar to those of FIG. 1.

The components of the detection apparatus 30 include a similar packet determination order determination unit 324 and a determination list addition position determination unit 325 in addition to the components illustrated in FIG. 1. The similar packet determination order determination unit 324 is configured to determine a determination order for similar packets stored in the similar packet storage unit 318. The determination list addition position determination unit 325 is configured to determine a position in the determination list stored in the determination list storage unit 316, to which a similar packet that has been determined to be not harmful by the harmfulness determination unit 310 is added.

Now, a description is given of a processing flow in the unauthorized communication detection system 2001 for a control system according to this embodiment. The processing flow described below is executed by each processing unit, which is embodied on an apparatus constructing the unauthorized communication detection system for a control system by loading programs stored in the storage devices of the control apparatus $10_1$ to $10_n$, the network apparatus 20, the detection apparatus 30, and the monitoring apparatus 40 into the memories for execution by the CPUs. Moreover, each program may be stored in a storage device in advance, or may be introduced as necessary via another storage medium or a communication medium (network or transmission wave propagating through network). In the unauthorized communication detection system 2001 according to this embodiment, processing basically similar to that executed in the unauthorized communication detection system 1 according to the first embodiment is executed. However, in the following description, processing that is different from that executed in the unauthorized communication detection system 1 according to the first embodiment is described.

The processing executed in the unauthorized communication detection system 2001 according to this embodiment is almost similar to that executed in the unauthorized communication detection system 1 according to the first embodiment. However, the processing of the similar packet storage processing S910 and S920 performed by the detection apparatus 30 and the processing of the harmfulness determination and determination list update processing S514 are different. Therefore, in the following, these processing are described.

First, a processing flow of the similar packet storage processing S910 and S920 according to this embodiment is described.

Figure 19:
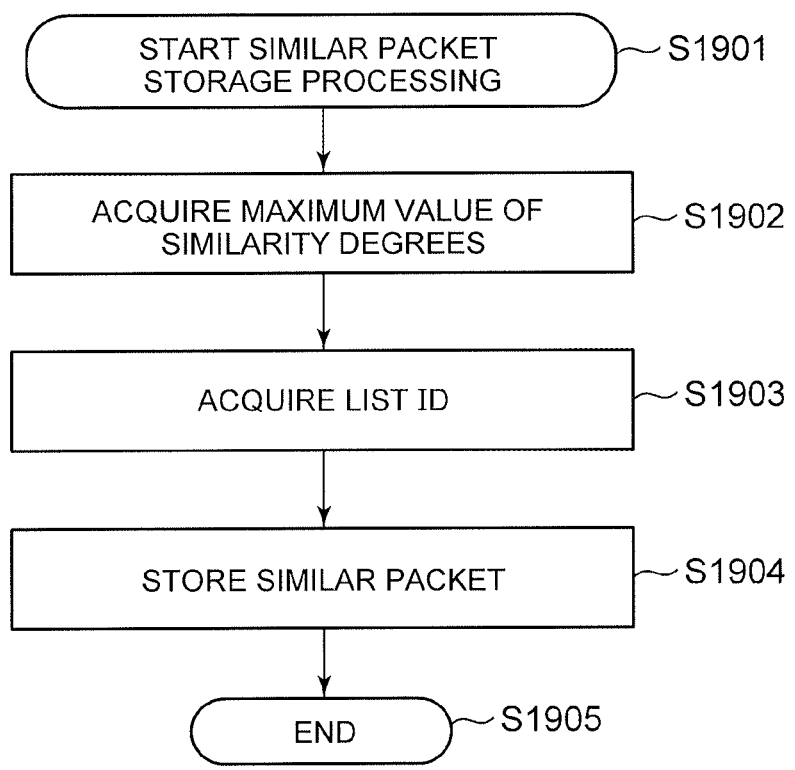
FIG. 19 is a diagram exemplifying a processing flow of storing a similar packet in the processing flow of verifying validity of a communication packet transmitted/received between the control apparatus with use of the detection apparatus in the unauthorized communication detection system for the control system according to the second embodiment of the present invention.

FIG. 19 is a diagram illustrating the processing flow of the similar packet storage processing S910 and S920 performed by the detection apparatus 30 in the unauthorized communication detection system 2001 for a control system, to which the second embodiment of the present invention is applied.

First, the detection apparatus 30 starts the similar packet storage processing (S1901).

Next, the detection apparatus 30 acquires the maximum value from among the similarity degrees calculated for respective similar packets (S1902).

Next, the detection apparatus 30 acquires a list ID associated with a valid data pattern of a record in the determination list for which the similarity degree takes the maximum value (S1903).

Next, the detection apparatus 30 stores the data pattern contained in the similar packet, the acquired maximum value of similarity degrees, the acquired list ID, and other values into the similar packet storage unit 318 (S1904). The configuration of the similar packet is described in detail with reference to FIG. 21.

Next, processing is finished (S1905).

Now, a description is given of the processing flow of the harmfulness determination and determination list update processing S514 according to this embodiment.

Figure 20:
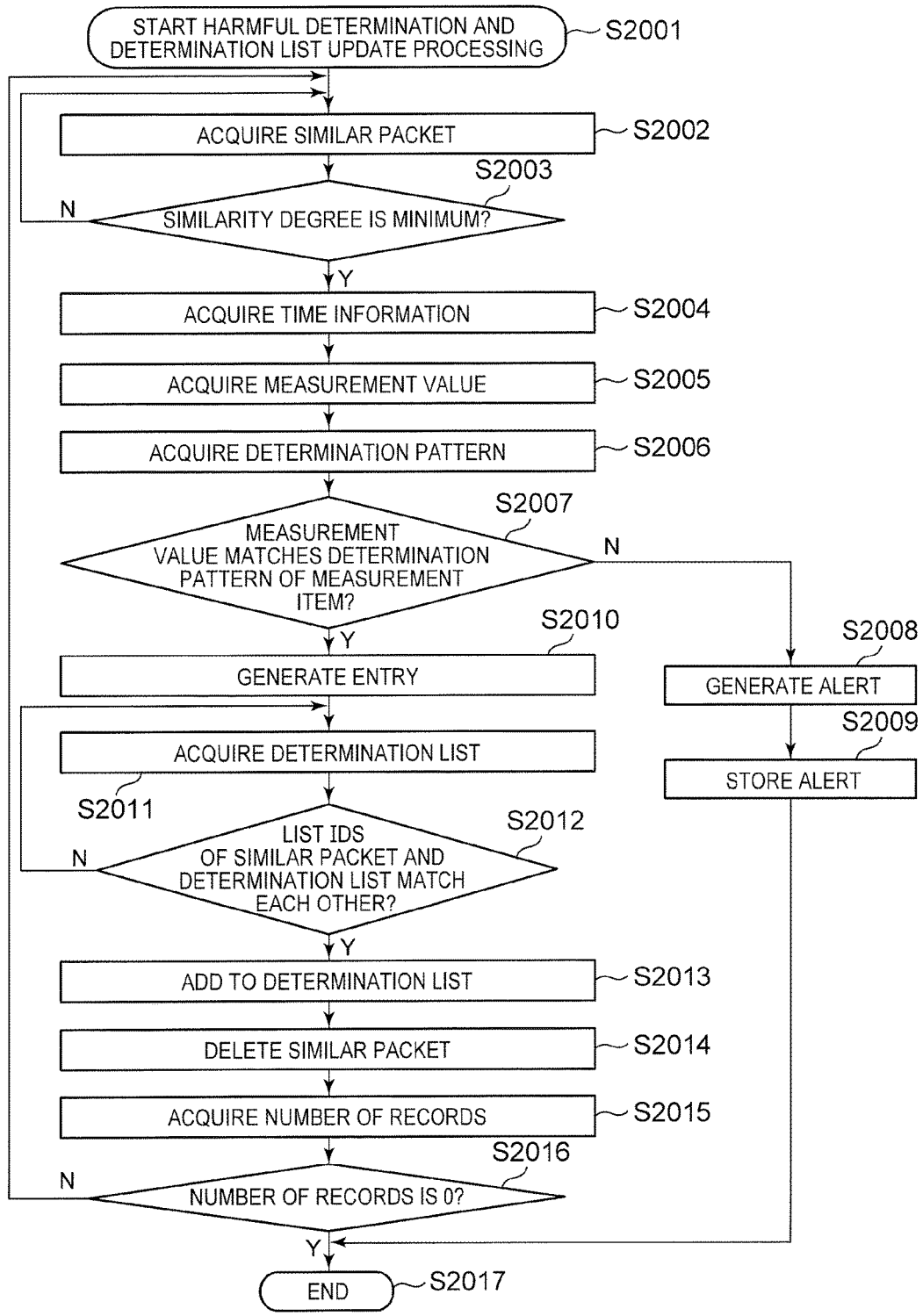
FIG. 20 is a diagram exemplifying a processing flow of processing of performing harmfulness determination and determination list update of a communication packet in the processing flow of verifying validity of a communication packet transmitted/received between the control apparatus with use of the detection apparatus in the unauthorized communication detection system for the control system according to the second embodiment of the present invention.

FIG. 20 is a diagram illustrating the processing flow of the harmfulness determination and determination list update processing S514 illustrated in FIG. 5 performed by the detection apparatus 30 in the unauthorized communication detection system 2001 for a control system according to the second embodiment of the present invention.

Regarding the processing flow illustrated in FIG. 20, processing steps of S2001, S2002, S2004 to S2010, and S2013 to S2017 are almost similar to those of S1101 to S1114 of the processing flow of the harmfulness determination and determination list update processing S514 of FIG. 11 in the first embodiment. Thus, the description thereof is omitted here, and the remaining steps are mainly described.

After one similar packet is acquired in S2002, the detection apparatus 30 compares the similarity degree contained in the acquired similar packet with the similarity degrees contained in the remaining similar packets stored in the similar packet storage unit 318, to determine whether the similarity degree is minimum (S2003). The method of comparing the similarity degrees here is to determine whether the similarity degree is minimum. However, the method is not limited to this determination.

As a result of the determination, when it is determined that the similarity degree is not minimum, the detection apparatus 30 returns to Step S2002, and acquires another similar packet from the similar packet storage unit 318. On the contrary, when it is determined that the similarity degree is minimum, the detection apparatus 30 acquires reception time information on the similar packet from the similar packet (S2004).

After an entry to be added to the determination list from the similar packet is generated (S2010), the detection apparatus 30 acquires from the determination list storage unit 316 a valid data pattern contained in the valid communication pattern of the determination list (S2011).

Next, the detection apparatus 30 determines whether the list ID contained in the similar packet and the list ID associated with the acquired valid data pattern match each other (S2012). As a result of the determination, when it is determined that the list ID contained in the similar packet and the list ID associated with the acquired valid data pattern do not match each other, the detection apparatus 30 returns to Step S2011, and acquires another valid data pattern from the determination list storage unit 316.

On the contrary, when it is determined that the list ID contained in the similar packet and the list ID associated with the acquired valid data pattern match each other, the detection apparatus 30 adds the generated entry to the determination list storage unit 316 (S2013). Here, an example of the method of storing the entry is assumed to be adding a list ID corresponding to an entry number to the generated entry and storing the combination of the list ID and the entry into the determination list storage unit 316. However, the manner of storage is not limited to this method. Moreover, the position to which an entry is added is, for example, right above or right behind a position in the determination list where the list IDs match each other (adjacent position), but is not limited to this position. In this manner, it is possible to make faster the processing speed at the time of determination of whether the measurement value acquired for each measurement item in S2007 matches the determination pattern of the measurement item, by placing similar entries adjacently to each other. Moreover, when the detection apparatus 30 is in a trial operation mode, the detection apparatus 30 generates the determination list and the determination pattern, and when the detection apparatus 30 is in an actual operation mode, the detection apparatus 30 updates the determination list and the determination pattern, and determines whether the communication packet is an unauthorized communication packet. Therefore, it is possible to effectively reduce amounts of erroneous detection and non-detection of communication packets flowing in a control system.

Figure 21:
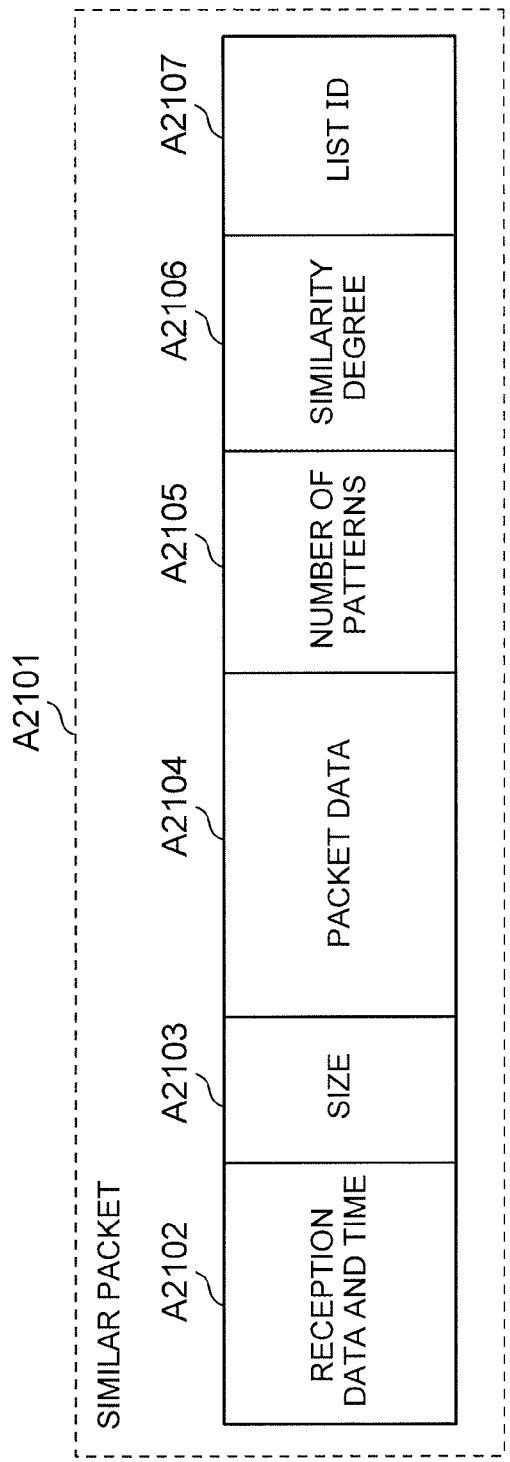
FIG. 21 is a diagram exemplifying a configuration of the similar packet to be stored into the similar packet storage unit of the detection apparatus in the unauthorized communication detection system for the control system according to the second embodiment of the present invention.

FIG. 21 is a diagram exemplifying a configuration of the similar packet to be stored into the similar packet storage unit 318 of the detection apparatus 30 in the unauthorized communication detection system 2001 for a control system according to the second embodiment of the present invention.

A similar packet (A2101) is formed of a reception date and time (A2102), a size (A2103), packet data (A2104), the number of patterns (A2105), a similarity degree (A2106), and a list ID (A2107).

The reception date and time (A2102), the size (A2013), the packet data (A2104), and the number of patterns (A2105) are the same as the reception date and time (A1702), the size (A1703), the packet data (A1704), and the number of patterns (A1705) of the similar packet (A1701) described in the first embodiment. The similarity degree (A2106) represents the maximum value of similarity degrees compared with valid data patterns stored in the determination list storage unit 316. The list ID (A2107) is a list ID for which the similarity degree takes the maximum value among the list IDs associated with valid data patterns stored in the determination list storage unit 316.

Next, a description is given of an unauthorized communication detection system 3001 for a control system according to a third embodiment of the present invention.

Figure 22:
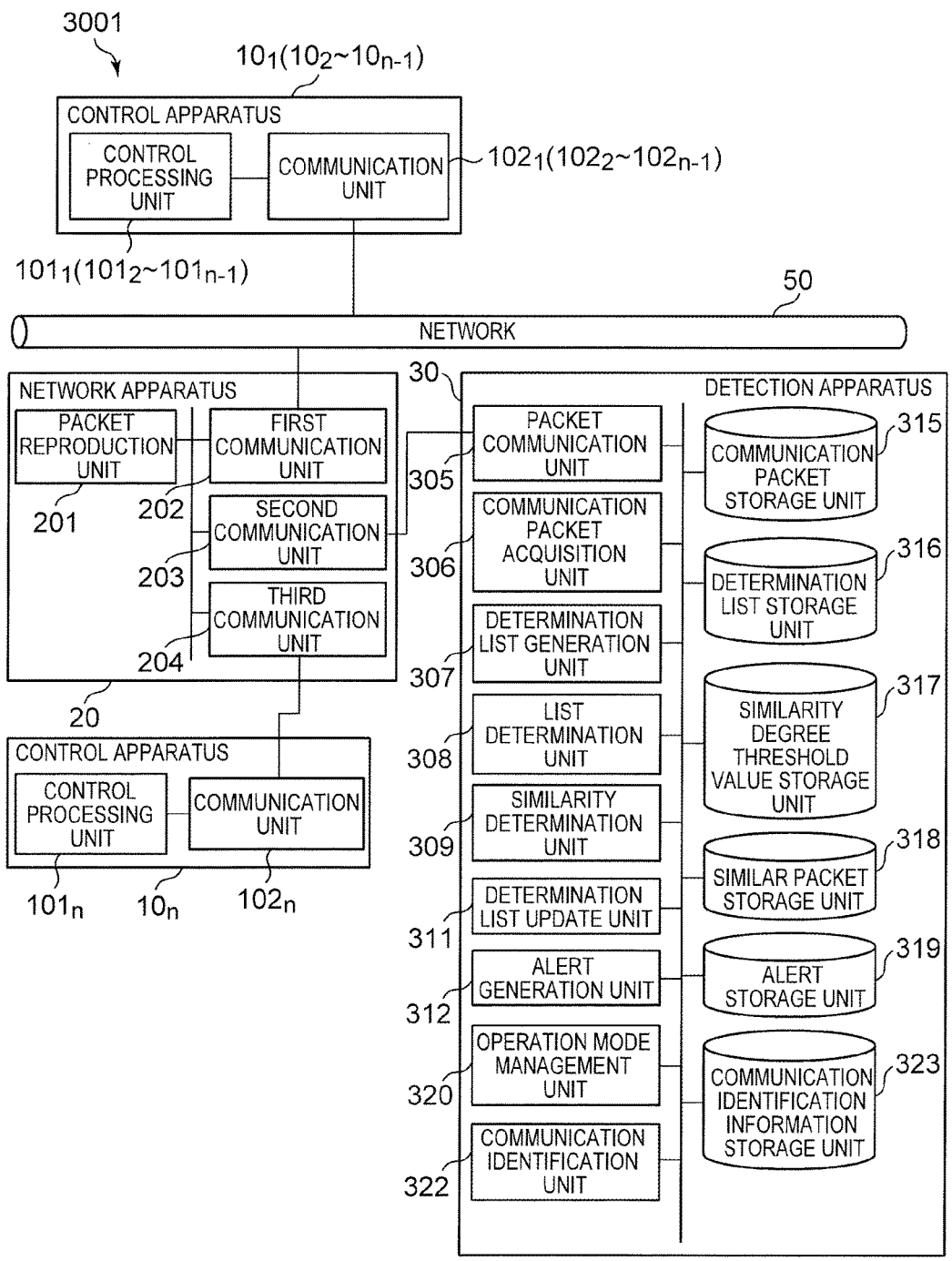
FIG. 22 is a diagram exemplifying a configuration of an unauthorized communication detection system for a control system according to a third embodiment of the present invention.

FIG. 22 is a configuration diagram of the unauthorized communication detection system 3001 for a control system according to the third embodiment of the present invention.

As exemplified in FIG. 22, the unauthorized communication detection system for a control system according to this embodiment includes the control apparatus $10_1$ to $10_n$, the network apparatus 20, the detection apparatus 30, and the network 50.

The components of the control apparatus $10_1$ to $10_n$ and the network apparatus 20 are similar to those of FIG. 1.

The components of the detection apparatus 30 according to this embodiment are the same as those of the detection apparatus 30 according to the first embodiment illustrated in FIG. 1 except that the detection apparatus 30 according to this embodiment does not include the measurement value communication unit 301, the measurement value acquisition unit 302, the determination pattern generation unit 303, the determination pattern update unit 304, the harmfulness determination unit 310, the measurement value storage unit 313, the determination pattern storage unit 314, and the reception time storage unit 321.

Moreover, in this embodiment, the format of similar packets stored into the similar packet storage unit 318 are as described in FIG. 17.

Now, a description is given of the processing flow in the unauthorized communication detection system 3001 for a control system according to this embodiment. The processing flow described below is executed by each processing unit, which is embodied on an apparatus constructing the unauthorized communication detection system for a control system by loading programs stored in the storage devices of the control apparatus $10_1$ to $10_n$, the network apparatus 20, the detection apparatus 30, and the monitoring apparatus 40 into the memories for execution by the CPUs. Moreover, each program may be stored in a storage device in advance, or may be introduced as necessary via another storage medium or a communication medium (network or transmission wave propagating through network). In the unauthorized communication detection system 3001 according to this embodiment, processing basically similar to that executed in the unauthorized communication detection system 1 according to the first embodiment is executed. However, in the following description, processing that is different from that executed in the unauthorized communication detection system 1 according to the first embodiment is described.

Now, a description is given of processing of generating a determination list to be used for detecting a communication packet, processing of detecting a communication packet, and processing of updating the determination list, which are executed by the detection apparatus 30 according to this embodiment.

Figure 23:
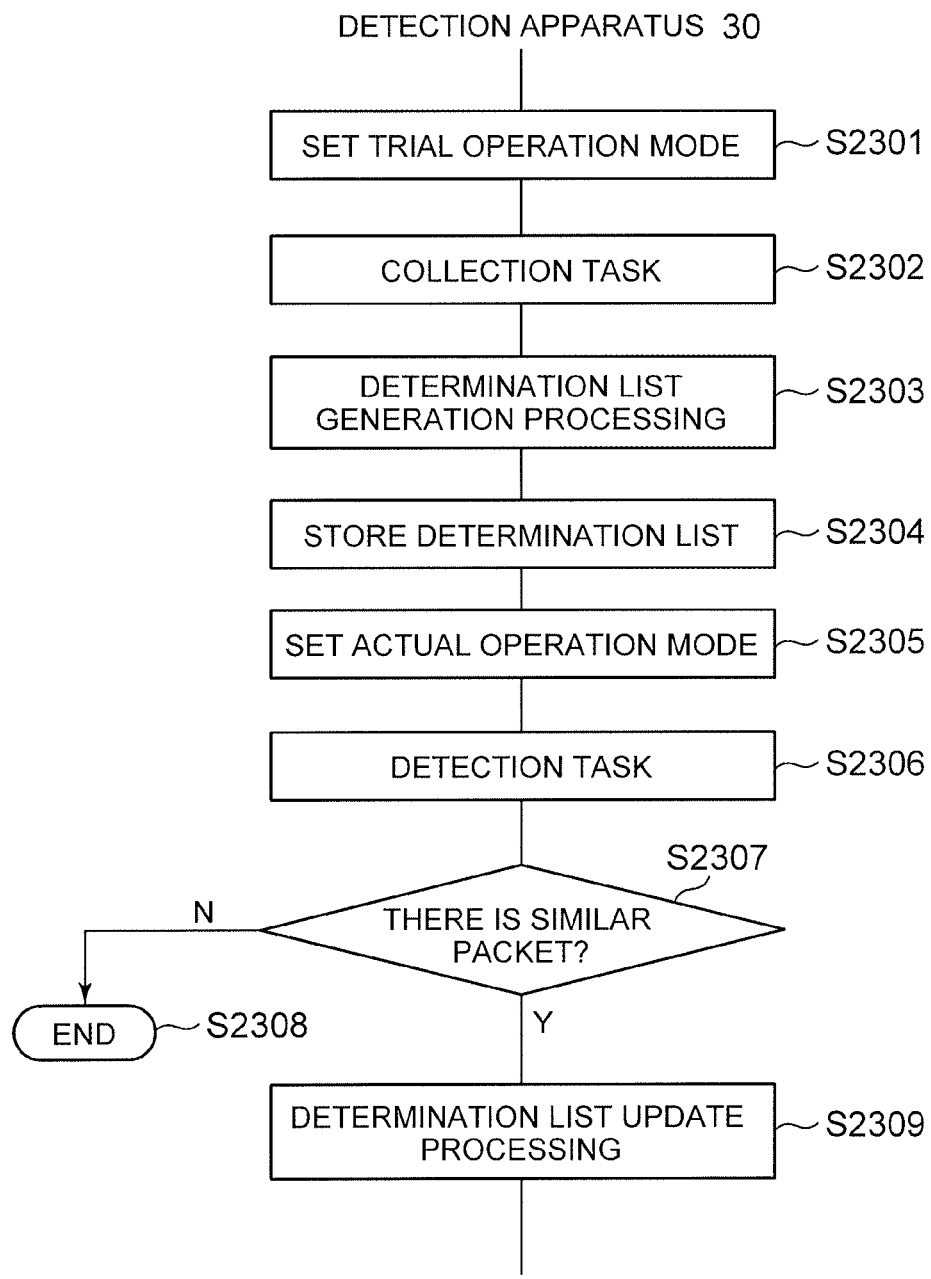
FIG. 23 is a diagram exemplifying a processing flow of detecting a communication packet in the unauthorized communication detection system for the control system according to the third embodiment of the present invention.

FIG. 23 is a diagram illustrating a processing flow involving: processing of generating a determination list and a determination pattern to be used for detection of a communication packet; processing of detecting a communication packet; and processing of updating the determination list and the determination pattern, which are executed by the detection apparatus 30 in the unauthorized communication detection system 3001 for a control system according to the third embodiment of the present invention.

Processing of generating a determination list, processing of detecting a communication packet, and processing of updating the list in this embodiment are similar to the processing described in the first embodiment based on FIG. 5. In other words, the detection apparatus 30 executes trial operation mode setting processing (S2301), collection task processing (S2302), determination list generation processing (S2303), determination list storage processing (S2304), actual operation mode setting processing (S2305), detection task processing (S2306), determination processing (S2307), finish processing (S2308), and determination list update processing (S2309), which are processing similar to S501 to S504, S508, S509, S511, S512 and S514 in FIG. 5. In this manner, it is possible to add a new entry to the determination list based on a communication packet having a valid data pattern in the actual operation.

In this manner, the detection apparatus 30 according to this embodiment does not acquire a measurement value from the monitoring apparatus 40, and detects an unauthorized communication packet based on the determination list obtained from communication packets (for example, control command and request).

Next, a description is given of processing of the determination list update processing S2309 performed by the detection apparatus 30 according to this embodiment.

Figure 24:
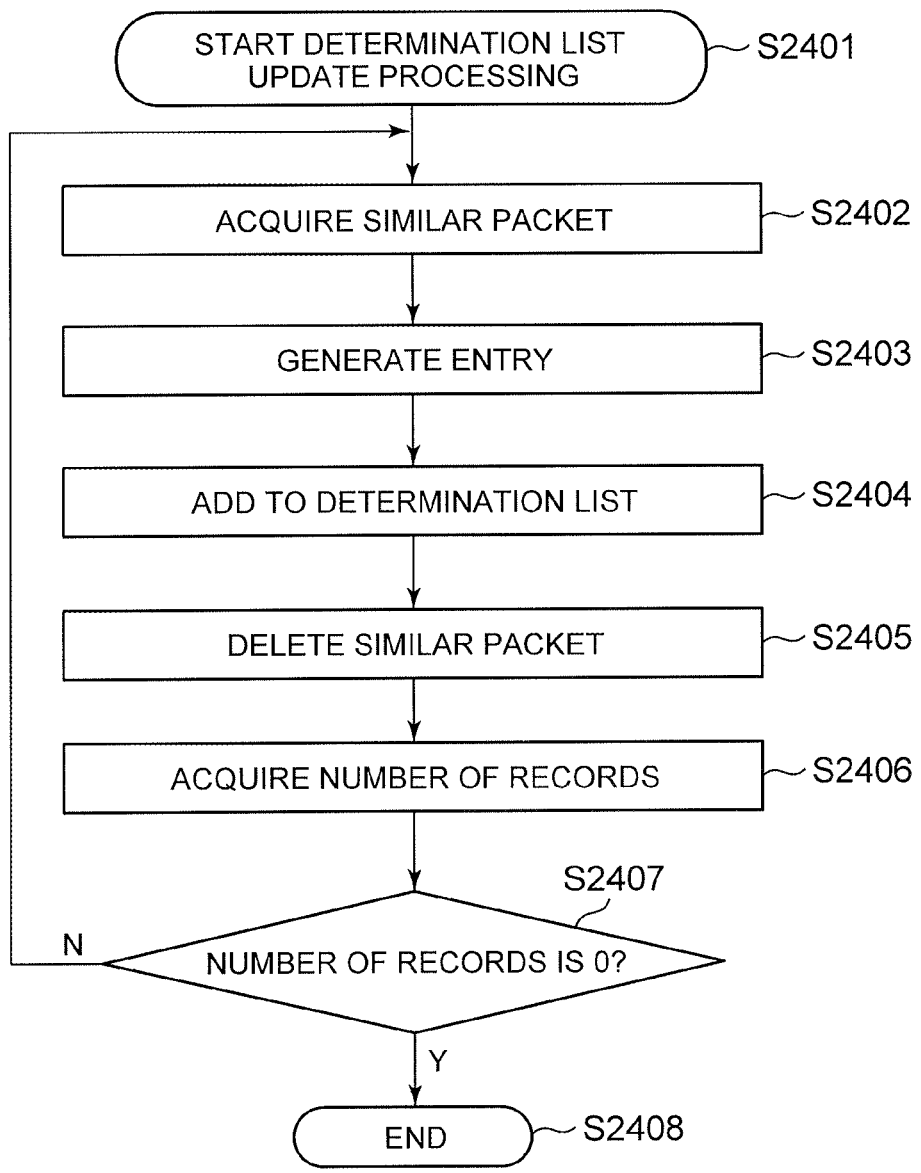
FIG. 24 is a diagram exemplifying a processing flow of processing of performing determination list update of a communication packet in the processing flow of verifying validity of a communication packet transmitted/received between the control apparatus with use of the detection apparatus in the unauthorized communication detection system for the control system according to the third embodiment of the present invention.

FIG. 24 is a diagram illustrating the processing flow of the determination list update processing S2309 performed by the detection apparatus 30 in the unauthorized communication detection system 3001 for a control system according to the third embodiment of the present invention.

The determination list update processing in this embodiment is similar to the determination list update processing described in the first embodiment based on FIG. 11. In other words, the detection apparatus 30 executes determination list start processing (S2401), similar packet acquisition processing (S2402), entry generation processing (S2403), determination list addition processing (S2404), similar packet deletion processing (S2405), number-of-records acquisition processing (S2406), number-of-records determination processing (S2407), and finish processing (S2308), which are processing similar to S1101, S1102, and S1109 to 1114 in FIG. 11.

It should be noted that the present invention is not limited to the above-mentioned embodiments, and various modifications can be made within the scope of the gist of the present invention.

For example, the detection apparatus 30 may include the functions of the monitoring apparatus 40. The detection apparatus 30 may include the functions of the network apparatus 20. The control apparatus $10_1$ to $10_n$, the detection apparatus 30, and the monitoring apparatus 40 may not include a function of communicating with the network 50, and may communicate with the network 50 via another apparatus. The monitoring apparatus 40 may include the functions of the detection apparatus 30. The detection apparatus 30 may not include, for example, the harmfulness determination processing function, the determination list update function, the determination pattern generation function, and the determination pattern update function, but another apparatus may include these functions and the detection apparatus 30 may communicate with another apparatus via the network 50.

Also in the embodiments described above, processing to be performed in the entire system does not change intrinsically.

Moreover, a part or all of the configurations and the like of the above-mentioned embodiments may be implemented by hardware by, for example, designing with an integrated circuit. Moreover, the configurations, functions, and the like described above may be implemented by software by a processor interpreting and executing a program for realizing each function. Information such as a program for realizing each function, a table, and a file, may be stored in a recording apparatus such as a memory, a hard disk, or a solid state drive (SSD), or may be stored in a recording medium such as an ID card, an SD card, or a DVD.

What is claimed is:

1. An unauthorized communication detection system that improves security and performance of a communication network, the system comprising:
   a communication interface that is communicatively coupled to a plurality of sensors via the communication network;
   a memory that stores a determination list for determining whether there is unauthorized communication, wherein the determination list includes a packet pattern and determination pattern that specifies a variation amount and a frequency for each of the plurality of sensors; and
   a processor that is communicatively coupled to the communication interface and the memory, wherein the processor:
   receives, using the communication interface, a communication packet that from a particular sensor from the plurality of sensors,
   extracts a measurement from the communication packet based on the packet pattern of the particular sensor,
   retrieves, from the memory, a particular determination pattern for the particular sensor,
   determines whether the frequency of the measurement is higher than the frequency of the particular determination pattern, and
   on a condition that the frequency of the measurement is higher than the frequency of the particular determination pattern, deletes the communication packet from the communication network.

2. The unauthorized communication detection system according to claim 1, wherein the processor further:
   on a condition that a variation of the measurement is higher than the variation of the particular determination pattern, deletes the communication packet from the communication network.

3. The unauthorized communication detection system according to claim 2, wherein
   on a condition that the frequency of the measurement is less than the frequency of the particular determination pattern and the variation of the of the measurement is less than the variation of the particular determination pattern, the processor further:
   updates the particular determination pattern based on the measurement value.

4. The unauthorized communication detection system according to claim 3, wherein the processor:

generates, in a trial operation mode, the determination list and the determination pattern based on packets flowing in the communication network.

5. The unauthorized communication detection system according to claim 1, wherein processor further:
compares the communication packet with the packet pattern of the particular sensor, and
on a condition that communication packet and the packet pattern of the particular sensor have a different pattern, deletes the communication packet from the network.

6. An unauthorized communication detection method that improves security and performance of a communication network, the method comprising:
receiving, by a detection system, a communication packet from a sensor via the communication network;
extracting, by the detection system, a measurement from the communication packet based on a packet pattern of the sensor;
retrieving, by the detection system, a particular determination pattern for the sensor, wherein a memory stores a determination list that includes the packet pattern and determination pattern that specifies a variation amount and a frequency for each of a plurality of sensors;
determining, by the detection system, whether a frequency of the measurement is higher than the frequency of the particular determination pattern,
on a condition that the frequency of the measurement is higher than the frequency of the particular determination pattern, deleting, by the detection system, the communication packet from the communication network.

7. A non-transitory computer readable storage medium that stores instructions for improving security and performance of a communication network, wherein the instructions when executed by a processor of a communication detection system cause the processor to:
receive, using a communication interface, a communication packet from a particular sensor via the communication network,
retrieve, from a memory, a particular packet pattern for the particular sensor, wherein the memory stores a determination list that includes a packet pattern and determination pattern that specifies a variation amount and a frequency for each of a plurality of sensors;
extract a measurement from the communication packet based on the particular packet pattern of the particular sensor,
retrieves, from the memory, a particular determination pattern for the particular sensor,
determine whether the frequency of the measurement is higher than the frequency of the particular determination pattern, and
on a condition that the frequency of the measurement is higher than the frequency of the particular determination pattern, delete the communication packet from the communication network.

8. The non-transitory computer readable storage medium according to claim 7, wherein the instructions further cause the processor to:
on a condition that a variation of the measurement is higher than the variation of the particular determination pattern, delete the communication packet from the communication network.

9. The non-transitory computer readable storage medium according to claim 7, wherein the instructions further cause the processor to:
on a condition that the frequency of the measurement is less than the frequency of the particular determination pattern and the variation of the of the measurement is less than the variation of the particular determination pattern, update the particular determination pattern based on the measurement value.

10. The non-transitory computer readable storage medium according to claim 9, wherein the instructions further cause the processor to:
generate, when in a trial operation mode, the determination list and the determination pattern based on packets flowing in the communication network.

11. The non-transitory computer readable storage medium according to claim 7, wherein the instructions further cause the processor to:
compare the communication packet with the packet pattern of the particular sensor, and
on a condition that communication packet and the packet pattern of the particular sensor have a different pattern, delete the communication packet from the network.

* * * * *